United States Patent
Ramasamy et al.

(10) Patent No.: US 11,963,110 B2
(45) Date of Patent: Apr. 16, 2024

(54) METHOD AND APPARATUS FOR DETECTING, MANAGING ANTENNA PROXIMITY, AND USER PRIVACY BY SHARING RADAR SENSING TELEMETRY

(71) Applicant: Dell Products, LP, Round Rock, TX (US)

(72) Inventors: Suresh K. Ramasamy, Cedar Park, TX (US); Karunakar P. Reddy, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 354 days.

(21) Appl. No.: 17/510,570

(22) Filed: Oct. 26, 2021

(65) Prior Publication Data

US 2023/0127758 A1 Apr. 27, 2023

(51) Int. Cl.
*H04W 52/38* (2009.01)
*G06F 1/3231* (2019.01)
(Continued)

(52) U.S. Cl.
CPC .......... *H04W 52/38* (2013.01); *G06F 1/3231* (2013.01); *G06F 3/017* (2013.01); *G06F 21/84* (2013.01);
(Continued)

(58) Field of Classification Search
CPC ..... H04W 52/38; H04W 52/04; H04W 92/18; H04W 88/06; H04W 52/283; H04W 52/288; G06F 1/3231; G06F 3/017; G06F 21/84; G06F 2221/033; G06F 1/1616; G06F 1/1662; G06F 1/1684; G06F 1/169; G06F 1/1698; G06F 3/3215; G06F 21/62; G06F 2221/2133; H01Q 1/243; H01Q 1/2266;
(Continued)

(56) References Cited

U.S. PATENT DOCUMENTS 10,222,469 B1 3/2019 Gillian
10,928,498 B1 2/2021 Li
(Continued)

FOREIGN PATENT DOCUMENTS

WO 2020/060945 A1 3/2020
WO 2021/154831 A1 8/2021

*Primary Examiner* — Lana N Le
(74) *Attorney, Agent, or Firm* — Prol Intellectual Property Law, PLLC; H. Kenneth Prol

(57) ABSTRACT

An information handling system may include a processor; a memory; a PMU; a wireless interface adapter for communicating, via a plurality of transceiving antennas operated by one or more radio frequency (RF) subsystems on a plurality of operating wireless links; a monolithic microwave integrated circuit (MMIC radar) to: scan for human presence around the information handling system; scan for human proximity near any of the plurality of transceiving antennas; an antenna controller to receive tagged telemetry data and execute an antenna proximity event algorithm using the tagged telemetry data as input and comparing the human proximity and movement relative to locations of the plurality of transceiving antennas on the information handling system; and an operating system to execute a privacy detect event module to identify a privacy detect event to secure the information handling system.

20 Claims, 6 Drawing Sheets

(51) Int. Cl.
  *G06F 3/01* (2006.01)
  *G06F 21/84* (2013.01)
  *H04W 52/04* (2009.01)
  *H04W 92/18* (2009.01)

(52) U.S. Cl.
  CPC ....... *H04W 52/04* (2013.01); *G06F 2221/033* (2013.01); *H04W 92/18* (2013.01)

(58) Field of Classification Search
  CPC .......... H01Q 21/28; H01Q 1/22; H01Q 1/245; H01Q 13/103; H04B 1/3827; H04B 1/3833; H04B 1/3838; H04B 7/0404; H04B 17/309; H04B 7/0608; H04M 1/72454; G01S 13/04
  See application file for complete search history.

(56) References Cited

U.S. PATENT DOCUMENTS

| | | | |
|---|---|---|---|
| 11,183,772 B2* | 11/2021 | Lee | G01S 13/325 |
| 11,194,032 B2* | 12/2021 | Cetinoneri | G01S 13/04 |
| 11,394,417 B1* | 7/2022 | Imana | H04B 5/0043 |
| 2013/0002434 A1 | 1/2013 | Cuddihy | |
| 2014/0269977 A1* | 9/2014 | Yang | H04B 7/0413 375/295 |
| 2017/0077977 A1* | 3/2017 | Prendergast | H04B 1/3838 |
| 2017/0097413 A1 | 4/2017 | Gillian | |
| 2019/0057777 A1 | 2/2019 | Joshi | |
| 2019/0321719 A1 | 10/2019 | Gillian | |
| 2020/0158819 A1 | 5/2020 | Joshi | |
| 2021/0026434 A1 | 1/2021 | Giusti | |
| 2021/0096217 A1 | 4/2021 | Jadidian | |
| 2021/0360344 A1* | 11/2021 | Eckert | H01Q 1/22 |
| 2022/0400446 A1* | 12/2022 | Ng | G01S 13/003 |

* cited by examiner

METHOD AND APPARATUS FOR DETECTING, MANAGING ANTENNA PROXIMITY, AND USER PRIVACY BY SHARING RADAR SENSING TELEMETRY

FIELD OF THE DISCLOSURE

The present disclosure generally relates to transceiving WWAN, and WLAN data streams via a plurality of antennas in an information handling system. The present disclosure more specifically relates to selecting and switching among a plurality of transceiving antennas via an intelligent wireless control system in an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include transceiving antennas for communication of cellular, Wi-Fi, GPS and Bluetooth signals.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
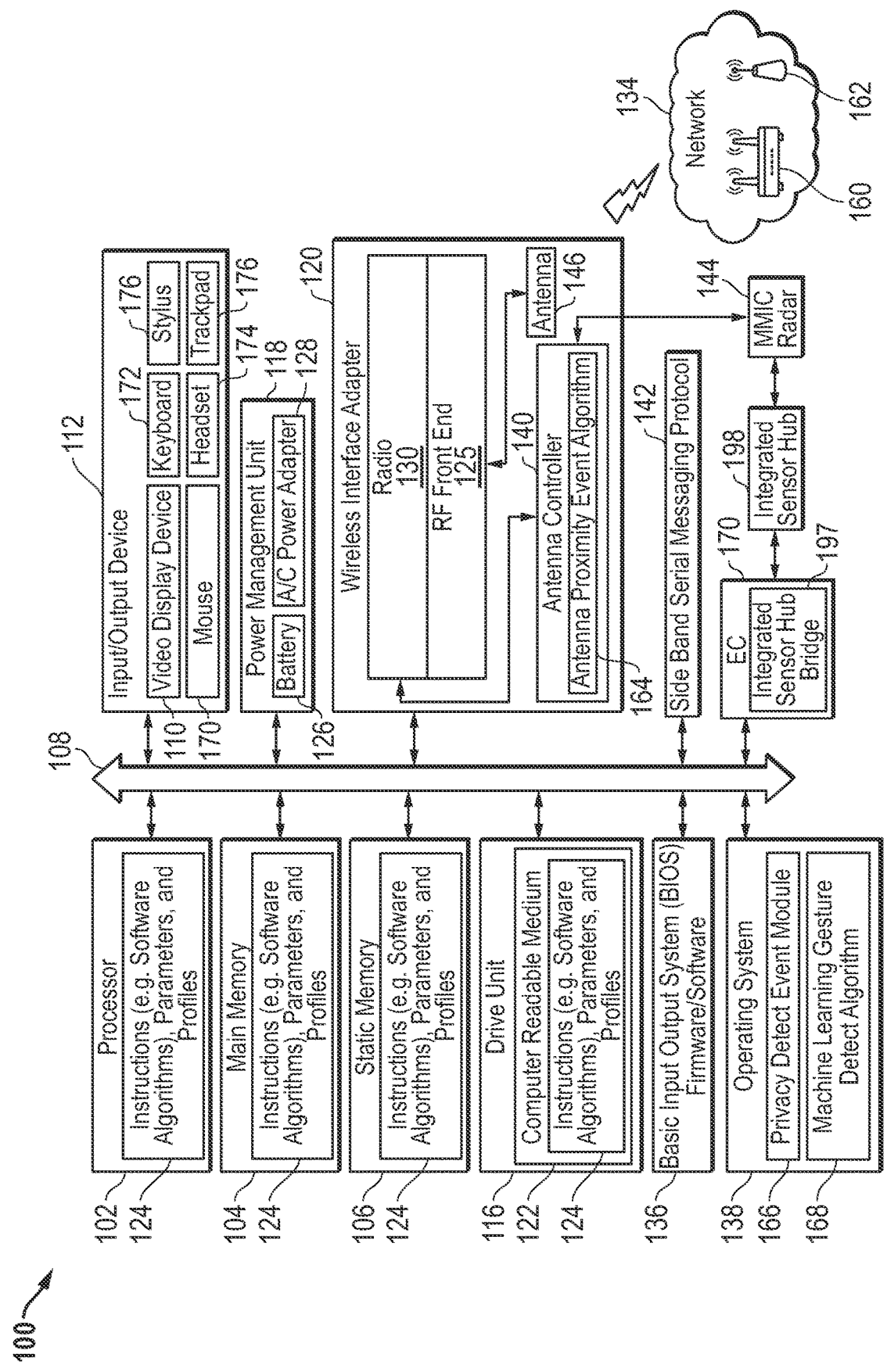
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, the abilities of these mobile information handling systems to receive and transmit various signals simultaneously increase in demand. Information handling systems including those that are mobile in embodiments of the present disclosure address this need by employing a plurality of antenna systems for communication via wireless links operating on a variety of radio access technologies (RAT). For example, a mobile information handling system in an embodiment of the present disclosure may employ separate antenna systems for Wi-Fi signals, wireless wide area network (WWAN) signals, Bluetooth signals, and wireless local area network (WLAN) signals. WWAN signals in embodiments of the present disclosure may include 2G standards such as GSM, 2.5G standards such as GSM EDGE and GPRS, 3G standards such as W-CDMA/UMTS and CDMA 2000, 4G standards such as LTE, LTE-A, LTE-LAA, emerging 5G standards, or WiMAX, small cell WWAN, and the like. Wi-Fi and WLAN signals in embodiments of the present disclosure may include wireless links adhering to standards such as, for example, IEEE 802.11 Wi-Fi, IEEE 802.11ad WiGig, IEEE 802.15 WPAN, and IEEE 802.11ax-2021 (e.g., Wi-Fi 6 and 6E, 6 GHz technologies). In other aspects, several antenna systems may be available for each RAT to enable aggregated data communications such as via plural multiple in, multiple out (MIMO) streams (e.g., Wi-Fi MIMO or cellular MIMO) to enhance data bandwidth or reliability. In some examples, an information handling system may support multi-RAT radios (4G, 5G, WLAN) that require simultaneous transmission using multiple antennas to support various modes of transmission (e.g., uplink (UL) MIMO and 5G E-UTRAN new radio (EN-DC)). With 5G technology, these information handling systems may use 4×4 sub-6 GHz antennas and 2×2 mm Wave antennas, while WLAN supports 2×2 antennas, resulting in a total of 8 antennas, out of which 4 of WWAN 5G antennas transmit to support EN-DC mode, while 2 of WLAN antennas simultaneously transmit during an UL MIMO operation, totaling to 6 transmit antennas in the information handling system in one example embodiment.

Capacitive sensing-based proximity sensors may be used in some information handling systems as sensing element which may be used to detect the presence of a user close to the antennas of the information handling systems. These proximity sensors require a co-axial cable to carry capacitance information back to, for example, an integrated circuit (IC). With antennas placed in various corners of the information handling system and one sensing IC placed in the middle of, for example, a motherboard (MB), this may require longer co-axial cables which results in a dilution of the antenna capacitance resulting from the addition of co-axial cable self-capacitance affecting the sensitivity and detection range of the IC. This may further require more than one or more sensing ICs placed at two ends of the information handling system to minimize the sensing cable lengths to preserve the antenna self-capacitance of serving antennas in that part of the information handling system. This further adds cost, complicates assembly, reduces space within the information handling system, and increases the number of dedicated parts in the information handling system thereby limiting the functionality to only detecting proximity at the antennas. Further, information handling systems supporting multiple antennas such as WLAN passive, WLAN active, 5G+WLAN, 4G+WLAN combined in a notebook-type or tablet-type information handling system may require different antenna designs which affect the sensing capacitance and therefore requires unique sensor IC calibration processes for detection of human presence. Mapping and managing proximity sensor ICs and the calibration thereof against RATs, antenna layouts within the information handling system, and various types of information handling systems (e.g., tablet, notebook, tent, etc.) under a single basic input/output system (BIOS) becomes further challenging.

The present specification describes systems and methods for scanning for human presence around the information handlings system, scanning for human proximity near any of the plurality of transceiving antennas, and, with a processor, mapping human presence and proximity of humans to create tagged telemetry data descriptive of the distance of human proximity and movement relative to the plurality of transceiving antennas. A monolithic microwave integrated circuit (MMIC radar) radar is used to scan for the human proximity and human presence near the antennas. With the information handling system, via a processor, the operating system executing a privacy detect even module may execute a privacy detect event to protect a user and secure the information handling system during operation upon determination of the MMIC radar of a user leaving the information handling system with far presence and proximity data detected. Similarly, the MMIC radar may detect with far presence and proximity data relative to the information handling system in an embodiment the presence and relative location of plural persons detected and able to view the display screen. This process may prevent unauthorized access to the information handling system or data presented on a display device of the information handling system, in various example embodiments. In such a way, data from the MMIC radar may be used to detect for human presence and relative proximity for privacy applications to control access or viewing of the information handling system in some embodiments. In another embodiment, the MMIC radar may also scan for gestures from a user by providing presence and proximity data to a machine learning gesture detect algorithm executing on the operating system to detect gestures of a user such as with the user's hands. In example embodiments, the MMIC radar may be used to map the human presence and proximity of humans to create tagged telemetry data descriptive of the distance of human proximity and movement of a person's hands, head or torso or the like, for example near or far proximity, relative to the display screen, keyboard, touchpad, or generally the information handling system itself.

In additional embodiments of the present disclosure, the MMIC radar may be used to map the human presence and proximity of humans to create tagged telemetry data descriptive of the distance of human proximity and movement relative to the plurality of transceiving antennas located at known positions on the information handling system or relative to the keyboard, touchpad, display, hinge or other components. With this embodiment, an antenna controller may receive, via a sideband communication executed by the wireless interface adapter, tagged telemetry data from the MMIC radar and execute an antenna proximity event algorithm using the tagged telemetry data as input, especially near proximity data for a user's hands, arms, lap, or other body parts. In some example embodiments, the health of the user may be protected with the antenna proximity event algorithm if and when the user's body is detected close to an antenna by the MMIC radar. The human presence and near proximity data received by MMIC radar may be used to limit the specific absorption rate (SAR) for human contact by redirecting the transmissions of any given antenna or turning off an antenna near the user's body. In this way, the MMIC radar data is shared for antenna proximity detection by an antenna controller as well as for other operations such as privacy event detection or gesture detection.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input and output (I/O) devices 112, such as a keyboard 172, a mouse 170, a video/graphic display 110, a stylus 176, a headset 174 (e.g., virtual reality (VR) headset), and a trackpad 178 or any combination thereof. The information handling system 100 can also include one or more buses 108 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of an antenna proximity event algorithm 164 and a privacy detect event module 166, machine learning gesture detection algorithm 168, and drive unit 116 (volatile (e.g., random-access memory, etc.), nonvolatile (read-only memory, flash memory etc.) or any combination thereof). In an example embodiment, the antenna proximity event algorithm 164 may be instructions 124 for execution by an antenna controller 140 at a wireless interface adapter 120.

As shown, the information handling system 100 may further include a video display device 110. The video display device 110 in an embodiment may function as a liquid crystal display (LCD), an organic light emitting diode (OLED), a flat panel display, or a solid-state display. Additionally, the information handling system 100 may include an alpha numeric input device such as a keyboard 172 and/or a cursor control device, such as a mouse 170, touchpad/trackpad 178, or a gesture or touch screen input device associated with the video display device 110. The information handling system 100 can also include a disk drive unit 116.

The network interface device shown as wireless interface adapter 120 can provide connectivity to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 160 or base station 162 used to operatively coupled the information handling system 100 to a network 134. In a specific embodiment, the network 134 may include macro-cellular connections via one or more base stations 162 or a wireless access point 160 (e.g., Wi-Fi or WiGig), or such as through licensed or unlicensed WWAN small cell base stations 162. Connectivity may be via wired or wireless connection. Wireless interface adapter 120 may include one or more radio frequency (RF) subsystems (e.g., radio 130) with transmitter/receiver circuitry, modem circuitry, one or more antenna front end circuits 125, one or more wireless controller circuits, amplifiers, antennas 146 and other circuitry of the radio 130 such as one or more antenna ports used for wireless communications via multiple radio access technologies (RATs). The radio 130 may communicate with one or more wireless technology protocols. The radio 130 may contain individual subscriber identity module (SIM) profiles for each technology service provider and their available protocols for any operating subscriber-based radio access technologies such as cellular LTE communications.

In an example embodiment, the wireless interface adapter 120, radio 130, and antenna 146 may provide connectivity to a one or more of the peripheral devices that may include a wireless video display device 110, a wireless keyboard 172, a wireless mouse 170, a wireless headset 174 such as a virtual reality headset and/or a microphone and speaker headset, a wireless stylus 176, and a wireless trackpad 178 among other wireless peripheral devices used as input/output (I/O) devices 112. Each of these wireless peripheral devices may include a wireless radio and an antenna to wirelessly couple the one or more peripheral devices to the information handling system 100 via the antenna 146 and radio 130. Wireless peripheral devices may operate with Bluetooth radio protocols in an embodiment. In other embodiments, wireless peripheral devices may operate with Wi-Fi 802.11 radio protocol, 5G NR radio protocols, or other wireless protocols. As described herein, an antenna controller 140 are operatively coupled to an operating system (OS) 138 that executes an antenna proximity event algorithm 164 and a privacy detect event module 166 in order to execute a privacy detect event to protect a user and secure the information handling system when tagged telemetry data is received by the OS 138. This tagged telemetry data is derived at the MMIC radar 144 may be determined based on near proximity, far proximity or other tags at the MMIC radar 144 or at another processing device such as the processor 120 in order to map human presence and proximity of one or more humans near the antenna 146 or the information handling system 100 to create the tagged telemetry data descriptive of the distance of human proximity and movement relative to the plurality of transceiving antennas and the information handling system 100.

As described, the wireless interface adapter 120 may include any number of antennas 146 which may include any number of tunable antennas for use with the system and methods disclosed herein. Although FIG. 1 shows a single antenna 146, the present specification contemplates that the number of antennas 146 may include more or less of the number of individual antennas shown in FIG. 1. Additional antenna system modification circuitry (not shown) may also be included with the wireless interface adapter 120 to implement coexistence control measures via an antenna controller 140 as described in various embodiments of the present disclosure.

In some aspects of the present disclosure, the wireless interface adapter 120 may operate two or more wireless links. In a further aspect, the wireless interface adapter 120 may operate the two or more wireless links with a single, shared communication frequency band such as with the 5G standard relating to unlicensed wireless spectrum for small cell 5G operation or for unlicensed Wi-Fi WLAN operation in an example aspect. For example, a 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas 146 or antennas 146 may be capable of operating at a variety of frequency bands. In a specific embodiment described herein, the shared, wireless communication band may be transmitted through a plurality of antennas used to operate in an N×N MIMO array configuration where multiple antennas 146 are used to exploit multipath propagation which may be any variable N. For example, N may equal 2, 3, or 4 to be 2×2, 3×3, or 4×4 MIMO operation in some embodiments. Other communication frequency bands, channels, and transception arrangements are contemplated for use with the embodiments of the present disclosure as well and the present specification contemplates the use of a variety of communication frequency bands.

In other aspects, the information handling system 100 operating as a mobile information handling system may operate a plurality of wireless interface adapters 120 for concurrent radio operation in one or more wireless communication bands. The plurality of wireless interface adapters 120 may further share a wireless communication band or operate in nearby wireless communication bands in some disclosed embodiments. Further, harmonics and other effects may impact wireless link operation when a plurality of wireless links are operating concurrently as in some of the presently described embodiments. The radio transmission or reception operates under the wireless interface adapter 120 which is made to execute an antenna proximity event algorithm 164 and a privacy detect event module 166 and potentially execute a privacy detect event such as an advanced configuration and power interface (ACPI) event according to present disclosure. In an embodiment, any of the antennas 146 may operate as dual band antennas that transceive at 2.4 GHz and 5 GHz, 2.4 GHz and 6 GHz, or 5 GHz and 6 GHz for example. Additionally, the dual band antennas may transceive at concurrent dual-band modes allowing transception to occur via at least two different frequencies such as 2.4 GHz and 5 GHz to communicate with a network and/or a peripheral device as described.

The wireless interface adapter 120 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth standards, or similar wireless standards may be used. Wireless interface adapter 120 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 134 may be based on the radio access network (RAN) standards that implement, for example, eNodeB or gNodeB hardware connected to mobile phone networks (e.g., cellular networks) used to communicate with the information handling system 100. In the example embodiment, mobile information handling system 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end (e.g., antenna front end 125 circuits) of the information handling system 100 may operate on a licensed WWAN wireless radio with authorization for subscriber access to a wireless service provider on a carrier licensed frequency band.

The wireless interface adapter 120 can represent an add-in card, wireless network interface module that is integrated with a main board of the information handling system or integrated with another wireless network interface capability, or any combination thereof. In an embodiment the wireless interface adapter 120 may include one or more radio frequency subsystems including transmitters and wireless controllers for connecting via a multitude of wireless links. In an example embodiment, an information handling system 100 may have an antenna system transmitter for 5G small cell WWAN, Wi-Fi WLAN or WiGig connectivity and one or more additional antenna system transmitters for macro-cellular communication. The RF subsystems and radios 130 include wireless controllers to manage authentication, connectivity, communications, power levels for transmission, buffering, error correction, baseband processing, and other functions of the wireless interface adapter 120.

The information handling system 100 may also include a monolithic microwave integrated circuit (MMIC) radar 144. An MMIC radar 144 is a type of integrated circuit that operates at, for example, microwave frequencies (e.g., 300 MHz to 300 GHz) and, in the context of the present specification, is used to scan for human presence around the information handling system 100 as well as scan for human proximity relative to the information handling system and, for example, near any of the plurality of transceiving antennas 146 of the information handling system 100. The human presence is detected by the MMIC radar 144 which may be used as a radar system for sensing the environment within and around the information handling system 100 including a detection of an object that is the size of a human and moves relative to the information handling system 100 like a human. This detected human presence may be used by the operation of the antenna controller 140 or other processor 102 to map the location of a human, including the user, relative to the information handling system 100/MMIC radar 144. In an embodiment, the human presence detected may include the presence of multiple humans.

In an embodiment, the OS 138 may receive the tagged telemetry data from the MMIC radar 144 and use the tagged telemetry data as input to the machine learning gesture detect algorithm 168 which may be a trained machine learning algorithm executing via OS 138 in an embodiment. The machine learning gesture detect algorithm 168 may provide output indicative of whether a gesture has been detected, what that gesture is meant to represent, and what input should be provided to the information handling system 100 and applications executed on the information handling system 100 to cause an application to receive the input or cause the information handling system to, for example, initiate an ACPI event. The MMIC radar 144 may be operatively coupled to an integrated sensor hub 198 that is operatively coupled to an embedded controller (EC) 170 via an integrated sensor hub bridge 197.

The human proximity data may include any data detected by the MMIC radar 144 that indicates a human body part is close to any given antenna 146. The tagged telemetry data created by the MMIC radar 144, such as designating proximity data as near or far data or designated at a plurality of distance categories, may be reported to the antenna controller 140 and used as input to an antenna proximity event algorithm 164 to determine whether a human's body is close to any of the transceiving antennas 146. In these embodiments, the detection of the presence of a user's or human's body close to the transceiving antennas 146 may be used to limit the specific absorption rate (SAR) for human contact. In an embodiment, the detection of this human proximity may result in the antenna controller 140 removing power from the radio 130 and antenna 146 to stop the transception and potential resulting SAR into the body. Alternative or additionally, the detection of this human proximity may result in the transmission power applied to the antenna 146 being reduced to limit the SAR for human contact. In an embodiment, the MMIC radar 144 may detect biological parameters of a human or user of the information handling system 100 confirming the presence of the user or human near the antenna 146 (e.g., human proximity). These biological parameters may be detected though the use of the mm-wave frequencies emitted by the MMIC radar 144 and from the nature of absorbed or reflected mm-wave frequencies from a stationary or moving body relative to other objects within a field of view of the MMIC radar 144. For example, the biological parameters may further include breathing, user body movements, a heartbeat, among others in various embodiments. Thus, although additional items close to the antenna 146 may have a SAR, the indication of the presence of these biological parameters may confirm that it is actual human presence and cause the antenna controller 140 to, after executing the antenna proximity event algorithm 164 described herein, execute a privacy detect event via the privacy detect event module 166 to maintain the privacy of the user's private information presented on the video display device 110 or maintained as data within the data storage devices (e.g., main memory 104, static memory 104, drive unit 116) of the information handling system 100. In an embodiment, the tagged telemetry data from the MMIC radar 144 with its detected biological parameters may be used as input to the antenna proximity event algorithm 164 that may compare the detected biological parameters to know human biological parameters such as human resting breathing rates, human body movements, among others.

During operation, the information handling system 100 may be turned on thereby initiating power to the wireless interface adapter 120 and the processors 102 that include the antenna controller 140 as well as, for example, the EC 170. The power may be provided via operation of a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device 110 or other input/output devices 112, and other components that may require power when a power button has been actuated by a user. In an embodiment, the PMU 118 may monitor power levels and be electrically coupled to the information handling system 100 to provide this power and coupled to bus 108 to provide or receive data or instructions. The PMU 118 may regulate power from a power source such as a battery 126 or A/C power adapter 128. In an embodiment, the battery 126 may be charged via the A/C power adapter 128 and provide power to the components of the information handling system 100 when A/C power from the A/C power adapter 128 is removed.

The powering up of the information handling system 100 and its systems also includes providing power to the MMIC radar 144. This may activate the MMIC radar 144 to begin to detect human presence and human proximity. In this embodiment, the MMIC radar 144 may emit a radar signal in the microwave frequencies and detect any reflected frequencies that may be reflected from an object such as a human or a plurality of humans. The MMIC radar 144 uses its radar features and doppler principles to detect the RF transmission reflections and provides the detected data to the antenna controller 140.

This data, in an embodiment, may be preliminary processed (e.g., at the MMIC radar 144 or using the processor 102 or an embedded controller) to detect whether the reflected RF transmissions indicate the presence of a human relative to the MMIC radar 144/information handling system 100. This process is referred to herein as creating tagged telemetry data that describes a physical presence of a human or humans as well as distance location of those humans relative to the MMIC radar 144 housed within the information handling system 100. The tagged telemetry data may include data descriptive of the relative location or distance in two or more ranges of humans or human body parts relative to the antennas 146 or other components of the information handling system 100 such as the keyboard 172 or video display device 110 to determine a distance of the humans from these components of the information handling system 100.

In an embodiment, this detection of human presence may include the detection of a single human (e.g., the user of the information handling system 100) as that human approaches the information handling system 100 or is sitting in front of the information handling system 100. In another embodiment, this detection of human presence may include the detection of a plurality of humans (e.g., the user of the information handling system 100 and onlookers or visitors) at or near the information handling system 100. In these embodiments, the human presence data along with the angle of arrival (AoA) and distance data of these detected human objects may be provided to the OS 138 executing a privacy detect event module 166 and a machine learning gesture detect algorithm 168 or the antenna controller 140 executing the antenna proximity event algorithm 164.

The potential outputs from the execution of the privacy detect event module 166 may include a determination as to whether a privacy detect event should be executed by the execution of the privacy detect event module 166 by the OS 138 to protect data or viewing of a user's display screen 110 for example. In an example embodiment, the privacy detect event output from the privacy detect event module 166 may include executing instructions for the EC 170 to execute an advanced configuration and power interface (ACPI) event that includes placing the information handling system 100 in a power state that includes one of a sleep state, a hibernation state, a standby state, or a power down state or which may lock display screen 110. In an embodiment, the processor 102 may send a signal, over an application program interface (API), to a user interface software associated with the video display device 110 to, for example, lock (e.g., cause a blank screen to appear) when a user leaves or a second person is detected or unlock (e.g., cause output images to appear) the screen based whether human presence has been detected as returning.

In the context of a user using the information handling system 100, the operation of the MMIC radar 144 may prevent data on a memory device from being accessed or data presented on the video display deice 110 from being seen in various embodiments. For example, the user may be interfacing with the information handling system 100, in an example embodiment, and leave to go engage in another activity without deactivating or shutting down power to the information handling system 100. At this point the MMIC radar 144, via use of its emitted microwave frequencies, detects that the user has moved away from the front of the information handling system 100 and can no longer be detected by the radar functions of the MMIC radar 144. Having scanned for human presence, the MMIC radar 144 may generate presence and location tagged telemetry data and provide that tagged telemetry data to the OS 138 or EC 170 via, for example, via a bus 108 or a side band communication using a side band serial messaging protocol 142. Once received, the OS 138 (with the processor 102) or, alternatively the EC 170, may use the tagged telemetry data as input into the privacy detect event module 166 to receive instructions related to if and how to execute a privacy detect event to protect a user and secure the information handling system 100. As one potential output from the execution of the privacy detect event module 166, the OS 138 may direct a privacy detect event module 166 to, at least, cause the images presented on the video display device 110 to be blank. Additionally, or alternatively, the execution of the privacy detect event module 166 may place the information handling system 100 in a specific power state that includes one of a sleep state, a hibernation state, a standby state, or a power down state. Access may then require log-in with credentials such as a log-in or biometrics to allow access.

In another context of a user using the information handling system 100, the operation of the MMIC radar 144 may prevent data on a memory device from being accessed or data presented on the video display deice 110 from being seen by another human. In this embodiment, the MMIC radar 144 may detect the presence of the user in front of the information handling system 100 (e.g., near proximity) with another human being present to be able to view the content presented to the user via the video display device 110 (e.g., mid proximity range or far proximity range). The MMIC radar 144, via use of its emitted microwave frequencies, detects the user and the other human and their respective movements, if moving, relative to the information handling system 100 and the MMIC radar 144. Having scanned for human presence while also scanning for human proximity, the MMIC radar 144 may create the tagged telemetry data and provide that tagged telemetry data to the OS 138 via, for example, an integrated sensor hub 198 and EC 170. Once received, the processor 102 and OS 138 may use this tagged telemetry data as input into the privacy detect event module 166 to receive instructions related to if and how to execute a privacy detect event to protect a user and secure the information handling system 100. As one potential output from the execution of the privacy detect event module 166, the OS 138 may direct the privacy detect event module 166 to, at least, cause the images presented on the video display device 110 to enter a sleep state or to be blank. In an embodiment, the user may be presented with a notice or message on-screen that another human may be capable of watching what is being presented on the video display device 110. Additionally, or alternatively, the execution of the privacy detect event module 166 may place the information handling system 100 in a specific power state that includes one of a sleep state, a hibernation state, a standby state, or a power down state.

In an embodiment, the tagged telemetry data from the MMIC radar 144 may also be provided to the antenna controller 140 for input into the antenna proximity event algorithm 164 and compare presence and proximity telemetry data with known positions of the antennas 146 within the information handling system 100. The antenna proximity event algorithm 164 may include a look-up table. This look-up table may include a number of triggers that may be used to define whether or not the transmission power of any of the antennas 146 should be lowered or turned off and whether a privacy detect event should be initiated as described herein. These triggers may include, among others, the detected presence of a human, proximity of a human or user body part relative to an antenna 146 and the information handling system 100, biological parameters detected by the MMIC radar, as well as any trajectory data related to the movement of the user or other humans relative to the antenna 146 and the information handling system 100. These inputs may be treated as data points that are used by the antenna controller 140 to reduce or remove power provided to the radio 130 and antenna 146 to reduce or stop the transception and potential resulting SAR into the body. As output from the execution of the antenna proximity event algorithm 164, the operation of the MMIC radar 144 may result in an increase, reduction, or elimination of power to a transmitting antenna 146. This is done if and when the user's body is within a certain proximity of the antenna 146. This may be done so as to set safe SAR levels for human contact. An increase in power to the antenna 146 may be a result of a determination that the tagged telemetry data indicates a user's body is moving away from the antenna 146. A reduction in power to the antenna 146 may be a result of a determination that the tagged telemetry data indicates a user's body is moving towards the antenna 146. An elimination of power provided to the antenna 146 may be a result of a determination that the tagged telemetry data indicates a user's body is sufficiently close to the antenna 146 that any reduction in power would not be sufficient to eliminate the health dangers the user may be subjected to (e.g., 2 cm or less). In order to maintain persistent wireless connectivity between the information handling system 100 and the wireless network 134, the output may also direct the data transceptions at the antenna 146 affected by the proximity of the user's body to be completed by another antenna 146 or group of antennas 146. In such a way, telemetry data from the MMIC radar 144 may be used for SAR level controls instead of previous systems that utilize capacitive proximity detector located at each antenna saving cost and assembly complexity for such a system.

In an embodiment, the antenna proximity event algorithm 164 is a machine learning service algorithm. Where a machine learning service is provided, such via network resources provided wirelessly to the information handling system 100, the input may be provided wirelessly to processing resources provided across the network 134 and outputs presented to the information handling system 100 wirelessly. In this example embodiment, the antenna proximity event algorithm 164 may be remote from the information handling system 100 and trained remotely. In an embodiment, the antenna proximity event algorithm 164 may be a trained module sent to the information handling system 100 from these remote processing service after the antenna proximity event algorithm 164 had been trained. In an embodiment, both the machine learning service algorithm and look-up table may be used with different inputs and determined outputs being added to the look-up table based on the classifier of the machine learning algorithm adjusting the table based on its past output performance feedback. The potential outputs from the execution of the antenna proximity event algorithm 164 by the antenna controller 140 (or remotely) describes how the operation of the radio 130/antenna 146 should be changed, if at all.

This process executed by the operation of the MMIC radar 144 and execution of the antenna proximity event algorithm 164 and privacy detect event module 166 by the antenna controller 140 and OS 138, respectively, may be conducted in real-time. Additionally, this process may be conducted as the information handling system 100 is in operation as well as when the information handling system 100 has been placed in a power state that includes one of a sleep state, a hibernation state, a standby state, or a power down state. As such, in an embodiment, the operation of the MMIC radar 144 may be continuous with the operations of the MMIC radar 144 being executed by the EC 170 that operates outside of direction and instruction from the OS 138 and the BIOS 136. This is done in order to initiate a "wake" command to startup the information handling system 100 again and allow the antenna controller 140 and OS 138 to receive the telemetry data and use that data as input to the antenna proximity event algorithm 164 and privacy detect event module 166, respectively, and to do so in-real time in some embodiments.

In an embodiment, the information handling system 100 may include a plurality of MMIC radars 144 each associated with an antenna 146 within the information handling system 100. With the MMIC radar 144 or multiple MMIC radars 144, a trajectory and position of the user's body may be detected relative any of the antennas 146 or the information handling system. Where the human proximity (e.g., user's body close to antenna 146) is detected within a proximity distance of an antenna 146 (e.g., set to 2 cm or less), these MMIC radars 144 may gather the trajectory and position data of the user's body relative to any affected antenna 146. Here, again, the MMIC radar 144 uses its emitted microwave frequencies to detect the location of the user's body parts in real-time. Having also scanned for human (e.g., user) proximity relative to an antenna 146, the MMIC radars 144 may create the tagged telemetry data, via use of the processor 102, and provide that tagged telemetry data to the antenna controller 140 and OS 138 via, for example, a side band communication using a side band serial messaging protocol 140 as described herein. Once received, the antenna controller 140 and OS 138 may use this tagged telemetry data as input into the antenna proximity event algorithm 164 and privacy detect event module 166 to receive instructions related to if and how to manage power provided to the antenna 146 as well as if and how to execute a privacy detect event to protect a user and secure the information handling system 100, respectively.

The information handling system 100 may also include a machine learning gesture detect algorithm 168 used to detect a gesture of a user. In this embodiment, the operation of the MMIC radar 144 may detect a user's gesture by detecting movement of the user's body parts such as a user's hand. A gesture may be a predefined movement of the user's body that may indicate that a specific action to be taken by the information handling system 100. For example, a gesture may allow the user, when detected as being present in front of the information handling system 100, to interact with output presented at the video display device 110. The MMIC radar 144 is used to detect the vector movements of the user's hand, for example, and processes those signals using machine learning techniques that can classify those gestures. During operation and after the MMIC radar 144 has detected movement by the user, the tagged telemetry data created by the MMIC radar 144 may be provided to a machine learning gesture detect algorithm 168 at the OS 138 as input. The machine learning gesture detect algorithm 168 may classify this detected movement of the user to determine if a predetermined gesture is being presented by the user. Where the machine learning gesture detect algorithm 168 determines that a gesture has been detected, the output may be presented to the processor to implement that output from the machine learning gesture detect algorithm 168 as input to the information handling system 100. For example, a user may have a streaming application being executed on the information handling system 100. A user may provide input to the execution of the streaming application using gestures. For example, where the user wants to advance the runtime of a video being played by the streaming application, a user may swipe a finger in the air. The MMIC radar 144 detects this movement and provides this data to the machine learning gesture detect algorithm 168 at the OS 138. The machine learning gesture detect algorithm 168 may be executed at the information handling system 100 at a processor 102 and by the OS 138 or, in some embodiments, in whole or in part remotely on a server that includes computing resources. In one example embodiment, the machine learning gesture detect algorithm 168 may be remote from the information handling system 100 to be trained remotely. In an embodiment, the machine learning gesture detect algorithm 168 operating at the processor 102 and OS 138 on the information handling system 100 may be a trained module sent to the information handling system 100 from these remote processing service after the machine learning gesture detect algorithm 168 had been trained. During operation and when the machine learning gesture detect algorithm 168 provides output indicating that a gesture has been detected, this gesture data may be provided to the processor 102 for the processor 102 to execute at, for example, an application executed on the information handling system 100.

The information handling system 100 can include a set of instructions 124 that can be executed to cause the computer system to perform any one or more of the methods or computer-based functions disclosed herein. For example, instructions 124 may execute an antenna proximity event algorithm, a machine learning gesture detect algorithm, various software applications, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and may include a computer-readable medium 122 in which one or more sets of instructions 124 such as software can be embedded to be executed by the processor 102 and antenna controller 140 to perform the processes described herein. Similarly, main memory 104 and static memory 106 may also contain a computer-readable medium for storage of one or more sets of instructions, parameters, or profiles 124 including one or more look-up tables and/or one or more antenna proximity event algorithm 164 and machine learning gesture detect algorithm 168. The disk drive unit 116 or static memory 106 also contain space for data storage. Further, the instructions 124 may embody one or more of the methods or logic as described herein. For example, instructions relating to the MMIC radar 144 and processing of the tagged telemetry data from the execution of the MMIC radar 144 via the privacy detect event module 166 and machine learning gesture detect algorithm 168 as described in the embodiments herein may be stored in a static memory 104 and executed by processor 102 via OS 138. In a particular embodiment, the instructions, parameters, and profiles 124 may reside completely, or at least partially, within the main memory 104, the static memory 106, and/or within the disk drive 116 during execution by the processor 102 or an antenna controller 140 of information handling system 100. The main memory 104 and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The privacy detect event module 166 and machine learning gesture detect algorithm 168 and the drive unit 116 may include access to a computer-readable medium 122 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium.

Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
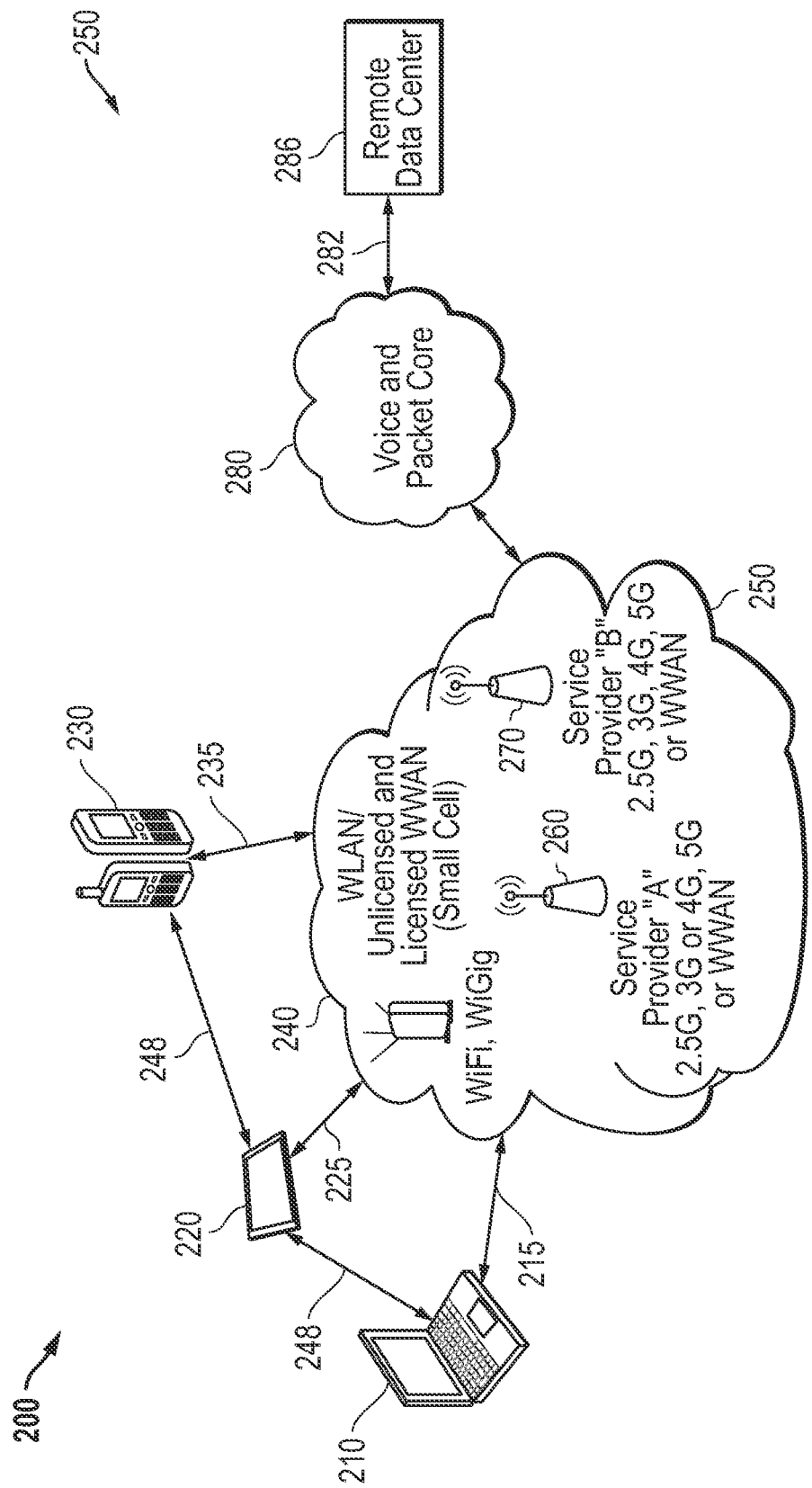
FIG. 2 is a block diagram of a network environment offering several communication protocol options and mobile information handling systems according to an embodiment of the present disclosure.

FIG. 2 illustrates a network 200 that can include one or more information handling systems 210, 220, 230. The information handling systems 210, 220, 230 shown in FIG. 2 may be similar to the information handling system 100 described in connection with FIG. 1. In a particular embodiment, network 200 includes networked mobile information handling systems 210, 220, and 230, wireless network access points, and multiple wireless connection link options. A variety of additional computing resources of network 200 may include client mobile information handling systems, data processing servers, network storage devices, local and wide area networks, or other resources as needed or desired.

As partially depicted, information handling systems 210, 220, 230 may be a laptop computer, tablet computer, 360-degree convertible systems, wearable computing devices, or a smart phone device. These mobile information handling systems 210, 220, and 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points (e.g., 160 FIG. 1) or base stations (e.g., 162, FIG. 1) may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6 GHz technologies), or emerging 5G small cell WWAN communications such as gNodeB, eNodeB, or similar wireless network protocols and access points. Alternatively, other available wireless links within network 200 may include macro-cellular connections 250 via one or more service providers 260 and 270. As described herein, a plurality of antennas may be operatively coupled to any of the macro-cellular connections 250 via one or more service providers 260 and 270 or to the wireless local area networks (WLANs) selectively based on the SAR data, RSSI data, configuration data, system operation and connection metrics, peripheral telemetry data, and antenna mounting locations (e.g., spatial locations of antennas within the information handling system) associated with each information handling systems 210, 220, 230 as described herein. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 240, 250 may be based on the radio access network (RAN) standards that implement, for example, eNodeB or gNodeB hardware connected to mobile phone networks (e.g., cellular networks) used to communicate with the information handling system 100. In the example embodiment, mobile information handling system 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the information handling system 100 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments, a networked mobile information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or the plurality of antennas in each information handling system 210, 220, 230 may be used on each of the wireless communication devices such as according to embodiments herein and may be suited to plural RF bands. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands may be subject to sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology. This may create situations where a plurality of antenna systems are operating on a mobile information handling system 210, 220 or 230 via concurrent communication wireless links on both WLAN and WWAN radios and antenna systems. In some embodiments, concurrent wireless links may operate within the same, adjacent, or otherwise interfering communication frequency bands and may be required to utilize spaced antennas. The antenna may be a transmitting antenna that includes high-band, medium-band, low-band, and unlicensed band transmitting antennas in embodiments herein. The antenna may cooperate with other antennas in a NxN MIMO array configuration according to the embodiments described herein. Alternatively, embodiments may include a single transceiving antennas capable of receiving and transmitting, and/or more than one transceiving antennas. Each of the antennas included in the information handling system 100 in an embodiment may be subject to the FCC regulations on specific absorption rate (SAR).

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile information handling systems 210, 220, and 230. Alternatively, mobile information handling systems 210, 220, and 230 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 220, and 230 allowing streamlining and efficiency within those devices. Similarly, remote data center permits fewer resources to be maintained in other parts of network 200. In an example embodiment, processing resources on the remote data center 286 may receive the tagged telemetry data and use that data as input to a privacy detect event module and/or machine learning gesture detect algorithm in order to complete the processing of that data on behalf of the mobile information handling systems 210, 220, and 230 or to train machine learning aspects of the same. In this embodiment, a trained privacy detect event module and/or machine learning gesture detect algorithm may be sent back to the mobile information handling systems 210, 220, and 230. In an example embodiment, the mobile information handling systems 210, 220, and 230 may communicate with a backend server such as the remote data center 286 or other server on at least one radio access technology (RAT) network to execute other remote applications or access remote data, websites, or communications.

Although 215, 225, and 235 are shown connecting wireless adapters of mobile information handling systems 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower and base stations such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as an access point or even potentially an WWAN connection via small cell communication on licensed or unlicensed WWAN connections. For example, one of mobile information handling systems 210, 220, and 230 may serve as a Wi-Fi hotspot in an embodiment. Concurrent wireless links to information handling systems 210, 220, and 230 may be connected via any access points including other mobile information handling systems as illustrated in FIG. 2.

Figure 3:
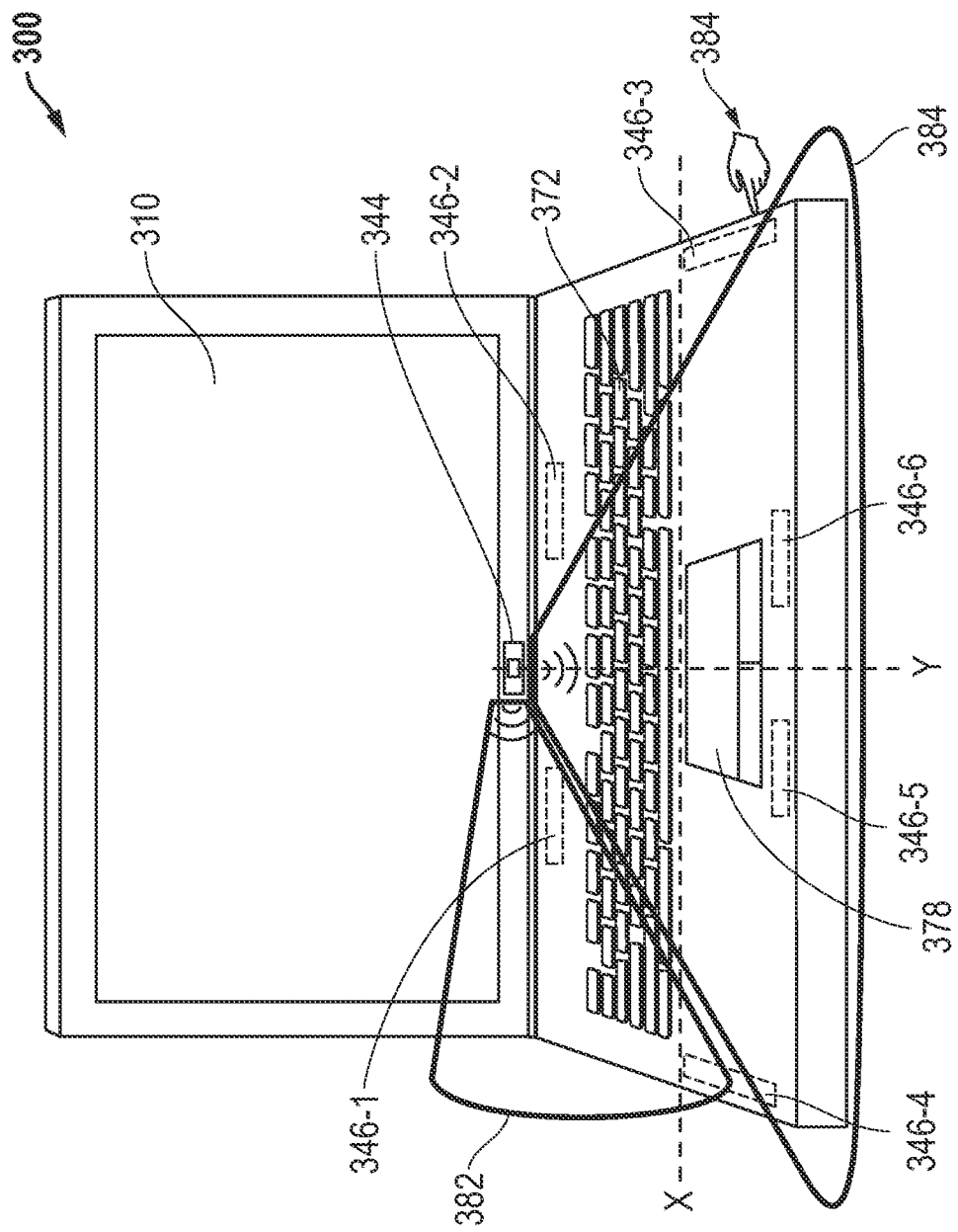
FIG. 3 is a block diagram illustrating an information handling system with a privacy and presence sensing system and plural antenna systems according to an embodiment of the present disclosure.

FIG. 3 is a block diagram illustrating an information handling system 300 with a privacy and presence sensing system according to an embodiment of the present disclosure. As described herein, the privacy and presence sensing system includes one or more MMIC radars 344 that detect the presence of one or more humans (including the user) at or near the information handling system 300. The human presence is detected by the MMIC radar 344 which may be used as a radar system for sensing the environment within and around the information handling system 300 in scanning fields 384 and 382 including a detection of an object that is the size of a human and moves relative to the information handling system 300 like a human. In an embodiment such as that shown in FIG. 3, the MMIC radar 344 may be placed at a location above a keyboard and below a video display device 310. This may allow the microwave frequencies emitted by the MMIC radar 344 to scan along a first radar scanning field area 384 that is relatively horizontal along a x-y plane and scan along a second radar scanning field area 382 that is relatively vertical and orthogonal to the x-y plane but in a scanning field covering the plural antenna 346-1, 346-2, 346-3, 346-4, 346-5, 346-6 as well as keyboard 372, touchpad 378, and areas in front of the video display screen 310. It is understood that the first radar scanning field area 384 and second radar scanning field area 382 of MMIC radar 344 depicted in FIG. 3 would cover the entire surface of the base chassis including antennas 346-1, 346-2, 346-3, 346-4, 346-5, 346-6, keyboard 372, touchpad 378, and areas at up to 180 degrees from the plane of the MMIC radar 144 and display 310 in various embodiments. As depicted, the first radar scanning field area 384 and second radar scanning field area 382 of MMIC radar 344 are merely exemplary to show perspective in the horizontal and vertical but not meant to be limiting. This allows the MMIC radar 144 to detect human presence by the information handling system 300 and human proximity (e.g., a user's hand 384) near any of the antennas 346-1, 346-2, 346-3, 346-4, 346-5, 346-6.

A detected human presence may be used by the operation of the antenna controller (e.g., 140, FIG. 1) or other processor executing privacy detect event module or machine learning gesture detect algorithm to map the location of a human or a plurality of humans, including the user, relative to the information handling system 300/MMIC radar 344. In an embodiment, the human presence detected may include the presence of multiple humans such as a user in front of the information handling system 300 (mid-range) and a human behind the user (e.g., far range).

The human proximity data may include any near-classified telemetry data detected by the MMIC radar 344 that indicates a human body part is close to any of the antennas 346-1, 346-2, 346-3, 346-4, 346-5, 346-6 in an embodiment where an antenna proximity event algorithm is executing. In these embodiments, the detection of the presence of a user's or human's body close to the transceiving antennas 346-1, 346-2, 346-3, 346-4, 346-5, 346-6 may be used to limit the specific absorption rate (SAR) for human contact. In an embodiment, the detection of this human proximity may result in the antenna controller executing the antenna proximity event algorithm to compare the location of a user or other human's body parts with known locations of the antennas 346-1, 346-2, 346-3, 346-4, 346-5, 346-6 in scanning fields 384 and 382. If the antenna proximity event algorithm determines a human is within a threshold distance (e.g., 2 cm) of an antenna, the antenna controller may remove power from the radio and antennas 346-1, 346-2, 346-3, 346-4, 346-5, 346-6 where the human proximity is detected to stop the transception and potential resulting SAR into the body. Alternative or additionally, the detection of this human proximity may result in the transmission power applied to one or more of the antennas 346-1, 346-2, 346-3, 346-4, 346-5, 346-6 being reduced to limit the SAR for human contact. In an embodiment, the MMIC radar 344 may detect biological movement of a human or user of the information handling system 300 confirming the presence of the user or human near one or more of the antennas 346-1, 346-2, 346-3, 346-4, 346-5, 346-6 (e.g., human proximity). Thus, although additional items close to any one of the antennas 346-1, 346-2, 346-3, 346-4, 346-5, 346-6 may have a SAR, the indication of the presence of a human via biological movement may confirm that it is actual human presence described herein, execute a power reduction procedure to protect the user from electromagnetic radiation emitted by the antennas 346-1, 346-2, 346-3, 346-4, 346-5, 346-6.

Additional components of the information handling system 300 can include one or more storage devices, one or more communications ports for communicating with external devices, as well as, various input and output (I/O) devices, such as a keyboard 372, a mouse, a video/graphic display 310, a stylus, a headset (e.g., virtual reality (VR) headset), and a trackpad 378 or any combination thereof. The tagged trajectory data tagged as near proximity by the MMIC radar 344 may be used by the antenna controller as input to the antenna proximity event algorithm executed by the antenna controller. As described herein the antenna proximity event algorithm may be a look up table that may be used to cross-reference a detected proximity (and/or human presence in some embodiments) and provide as output indicating instructions as to if and to what extent to reduce power to the transmitting antennas (e.g., fifth antenna 346-5 and/or sixth antenna 346-6). In FIG. 3, due to the placement of a fifth antenna 346-5 and a sixth antenna 346-6 around the location of the trackpad 378, the MMIC radar 344 may detect human proximity nearby (e.g., within 2 cm of the fifth antenna 346-5 and sixth antenna 346-6) and reduce or eliminate power transmission levels of those antennas 346-5, 346-6. Here, this human proximity may occur when the user users the trackpad 378 and places the user's hand 384 by these antennas 346-5, 346-6 as a result of their close location relative to each other. In this embodiment, the MMIC radar 344, having detected the location and trajectory of the user's hand, may engage in processing of the received location and trajectory telemetry data tagged as near describing the distance of human proximity and movement relative to the plurality of transceiving antennas 346-1, 346-2, 346-3, 346-4, 346-5, 346-6. This process may be implemented to limit the SAR for human contact thereby preventing injury to the user. The instructions provided to the antenna controller via output from the antenna proximity event algorithm may also include instructions to other antennas 346-1, 346-2, 346-3, 346-4, 346-5, 346-6 to provide for data transception to accommodate for any lack of data transmissions at the fifth antenna 346-5 and sixth antenna 346-6 or other antenna with humans detected within a proximity threshold once that occurs.

In an embodiment, the MMIC radar 344 may detect the presence of a human at a far range beyond a range where the user would be to interface with the information handling system 100. This far-tagged telemetry data may be provided to the EC and processor/OS of the information handling system in executing the privacy detect event module. As described herein, the far-tagged telemetry data may be used to detect an approach of a user to the information handling system, the user leaving in front of the information handling system, or the presence of other humans besides the user. With the far-tagged telemetry data, the MMIC radar 344 may pass the tagged telemetry data indication the location of humans relative to the information handling system 200 to the integrated sensor hub 198 that is operatively coupled to an embedded controller (EC) 170 via an integrated sensor hub bridge 197. The EC may provide this data to the OS and processor to execute the privacy detect event module to determine if and what privacy events to execute. In an example embodiment, the privacy detect event output from the privacy detect event module may include executing instructions for the EC to execute an advanced configuration and power interface (ACPI) event that includes placing the information handling system 300 in a power state that includes one of a sleep state, a hibernation state, a standby state, or a power down state. In this embodiment, the processor or EC may send a signal, over an API, to a user interface software associated with the video display device to, for example, lock (e.g., cause a blank screen to appear) or unlock (e.g., cause output images to appear) the screen based whether human presence has been detected or not and whether that human presence is near range or far range indicating the presence of a user and another human. In an embodiment, the user may be presented with a notice or message on-screen that another human may be capable of watching what is being presented on the video display device.

The information handling system 300 may also include a machine learning gesture detect algorithm used to detect a gesture of a user at a mid-range within the scanning fields 384 and 382. The operation of the MMIC radar 344 may detect a user's gesture by detecting movement of the user's body parts such as a user's hand. The MMIC radar 344 is used to detect the vector movements of the user's hand, for example, and processes those signals using machine learning techniques that can classify those gestures. During operation and after the MMIC radar 344 has detected movement by the user, the tagged telemetry data created by the MMIC radar 344 may be provided to a machine learning gesture detect algorithm at the OS as input. The machine learning gesture detect algorithm may classify this detected movement of the user to determine if a predetermined gesture is being presented by the user. Where the machine learning gesture detect algorithm determines that a gesture has been detected, the output may be presented to the processor to implement that output from the machine learning gesture detect algorithm as input to the information handling system 300. For example, a user may have a streaming application being executed on the information handling system 300. A user may provide input to the execution of the streaming application using gestures. For example, where the user wants to advance the runtime of a video being played by the streaming application, a user may swipe a finger in the air. The MMIC radar 344 detects this movement and provides this data to the machine learning gesture detect algorithm executed by the processor at the OS. The machine learning gesture detect algorithm may be executed at the information handling system 300 at the processor and by the OS or, in some embodiments, in whole or in part remotely on a server that includes computing resources. During operation and when the machine learning gesture detect algorithm provides output indicating that a gesture has been detected, this gesture data may be provided to the processor for the processor to execute at, for example, an application executed on the information handling system 300.

It is appreciated that, although FIG. 3 shows a laptop-type information handling system 300, the method and systems described herein applies to other types of information handling systems. In an embodiment, the information handling system 300 may be a convertible information handling system 300 that may be placed in one of multiple configurations. One configuration may include a table configuration where a keyboard portion is placed behind the display portion of the information handling system 300. Another configuration includes an easel configuration where the keyboard portion is rotated behind the display portion and used as a stand to hold the display portion up. Still another configuration includes a tent configuration where a front edge of the keyboard portion and a top edge of the display portion are rested on a surface such as a table and the display portion is made viewable to a user. Other orientations are contemplated in the present specification.

Figure 4:
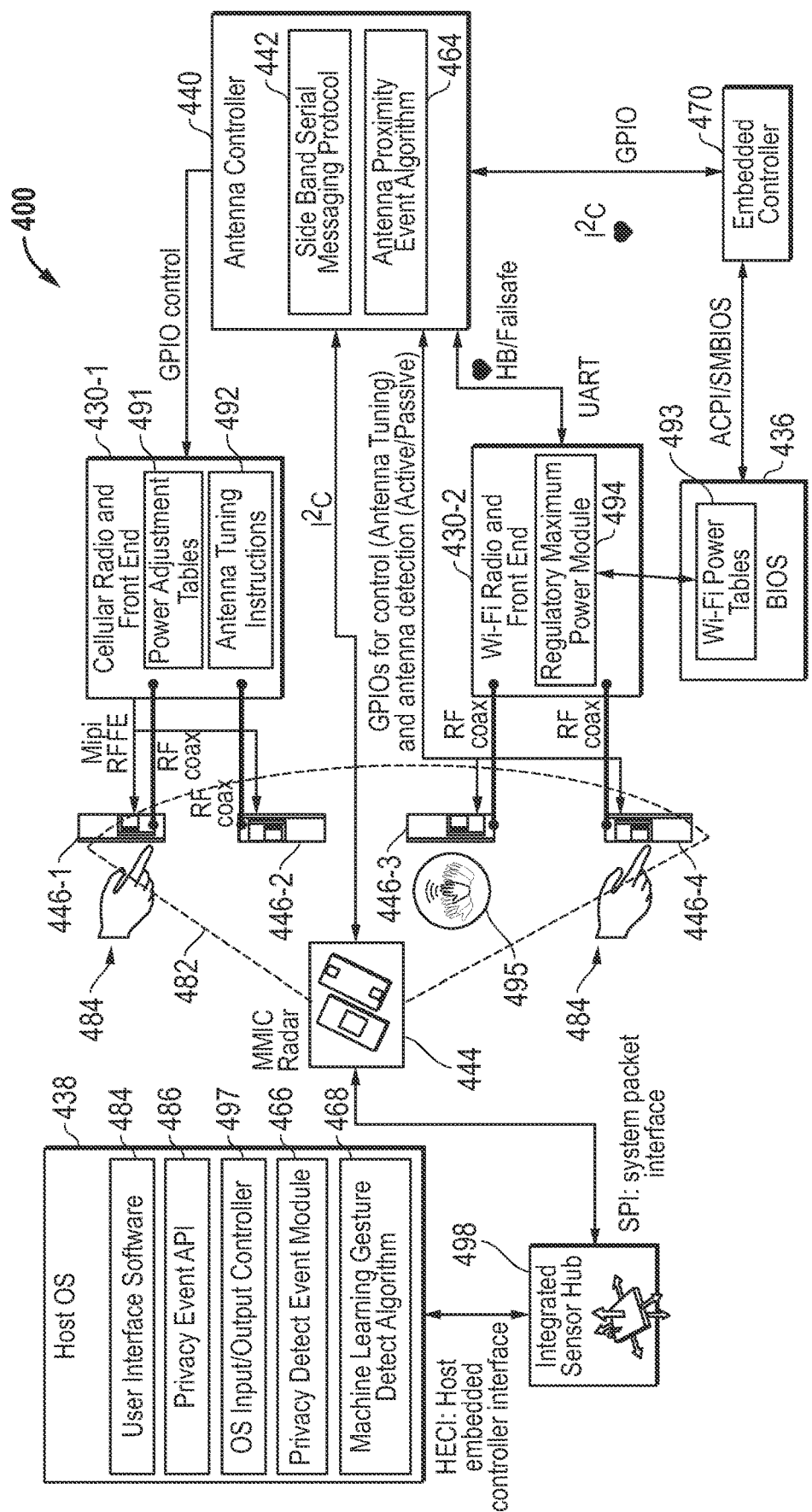
FIG. 4 is a block diagram illustrating an information handling system with a privacy and presence sensing system and plural antenna systems according to an embodiment of the present disclosure.

FIG. 4 is a block diagram illustrating an information handling system 400 with a privacy and presence sensing system according to an embodiment of the present disclosure. FIG. 4 shows a MMIC radar 444 operated within the information handling system 400 to detect human presence, human proximity to an antenna 446-1, 446-2, 446-3, 446-4 (e.g., user's hand 484 near an antenna 446-1, 446-2, 446-3, 446-4), gesture detection, and detect human presence near the information handling system 400 other than the user.

As described herein, the MMIC radar 444 may, when powered up, scan for human presence around the information handling system 400. In this embodiment, the MMIC radar 444 may scan for any human including a user and other humans that may be considered "on-lookers" that can potentially view a video display device (e.g., FIG. 1, 110). As described herein, the MMIC radar 444 is a type of integrated circuit that operates at, for example, microwave frequencies (e.g., 300 MHz to 300 GHz) and, in the context of the present specification, is used to scan for human presence around the information handling system 400 as well as scan for human proximity near any of the plurality of transceiving antenna 446-1, 446-2, 446-3, 446-4 of the information handling system 400 as described.

The human presence is detected by the MMIC radar 444 which may be used as a radar system for sensing the environment within and around the information handling system 400 including a detection of an object that is the size of a human and moves relative to the information handling system 400 like a human. In an embodiment, the MMIC radar 444 may detect biological parameters of a human or user of the information handling system 400 confirming the presence of the user or human near the information handling system 400. These biological parameters may be detected though the use of the mm-wave frequencies emitted by the MMIC radar 444 that when absorbed or reflected from a stationary or moving body help distinguish other objects. In a further example, the biological parameters may include breathing, user body movements, a heartbeat, among others to help detect a human object or body part by the MMIC radar 444. This detected human presence may be used by the operation of the antenna controller 440 or other processor (e.g., embedded controller (EC) 470 or other processor such as the GPU) to map the location of a human, including the user and an on-looker, relative to the information handling system 400/MMIC radar 444.

In one example embodiment, the MMIC radar 444 may detect the user as the user approaches or leaves the area around the information handling system 400. Because the MMIC radar 444 not only detects the presence of the user but also detects the movement of the user, the MMIC radar 444 may sense the position and movement within a near-range, mid-range, and far-range monitored area 482. With this tagged telemetry data, the host OS 438 receives this position and movement tagged telemetry data at a processor such as the EC 470 or other processing device for processing. In either case, the tagged telemetry data may be sent to the OS 438 by the MMIC radar 444 executing a privacy detect event module 466. As described herein, the OS 438 may use this tagged telemetry data as input to the privacy detect event module to maintain the privacy of the user's private information presented on the video display device or maintained as data within the data storage devices (e.g., main memory, static memory, drive unit) of the information handling system 400.

The potential outputs from the execution of the privacy detect event module 466 may include a determination as to whether a privacy detect event should be executed by the execution of the privacy detect event module 466 by the host OS 438. In an example embodiment, the privacy detect event output from the privacy detect event module 466 may include executing instructions for the EC 470 to execute an advanced configuration and power interface (ACPI) event that includes placing the information handling system 400 in a power state that includes one of a sleep state, a hibernation state, a standby state, or a power down state. In this embodiment, the processor or EC 470 may send a signal, over an API, to a user interface software associated with the video display device to, for example, lock (e.g., cause a blank screen to appear) or unlock (e.g., cause output images to appear) the screen based whether human presence has been detected or not.

As shown in FIG. 4, the location and movement tagged telemetry data is sent directly from the MMIC radar 444 to each of the antenna controller 440 and an integrated sensor hub 498. As such, the tagged telemetry data is sent to the OS 438 via, for example, an integrated sensor hub 498 (e.g., over a system packet interface and host embedded controller interface) as well as the EC 470 in those cases where a user is approaching the information handling system 400. As described herein, the approach of the user may be detected by the MMIC radar 444 and may "wake" the information handling system 400 from a sleep state. Because this sleep state may include one of a hibernation state, a standby state, or a power down state, the host OS 438 may not be operating and transmission of the location and movement tagged telemetry data to the EC 470 may allow for the EC to initiate the "wake" process and transfer this data to the OS 438 when woken.

In an example where the MMIC radar 444 has detected the presence of just the user in front of the information handling system 400/MMIC radar 444 (e.g., a human presence in a mid-range area), the output from the execution of the privacy detect event module 466 may determine from the tagged telemetry data whether the user is moving towards or away from the information handling system 400. In the embodiment, where the user is detected as moving away from the information handling system 400, the output from the execution of the privacy detect event module 466 may cause the antenna controller 440 to execute a process to prevent data from being accessed on the information handling system 400 or the information presented on a video display device from being seen. In an embodiment, the executed processes may include the OS 438 with the processor or EC 470 executing a power state that includes one of a sleep state, a hibernation state, a standby state, or a power down state. The specific power state may be controlled by an EC 470 or other processing device executing one or more of these ACPI event. Alternatively, or additionally, the antenna controller 440 may access user interface software 484 to cause the screen of the video display device to be rendered unviewable with one of a blank screen (e.g., locked screen) or an image unrelated to the security of the data presented (e.g., a stock image often referred to a wallpaper). The user may interface with a security application executing a privacy event application programming interface API 486 to set a preferred action to be taken when the MMIC radar 444 detects that the user is walking away from the information handling system 400. For example, the user may select an ACPI state to place the information handling system 400 in and what to do with the screen of the video display device prior to the MMIC radar 444 taking action. These preferences may be executed by the OS 438, user interface software 484, and privacy event API 486 accordingly. In an embodiment, the OS 438 may coordinate with an OS input/output controller 497 to prevent input/output devices from providing input to wake or otherwise provide access to the data on the information handling system 400 without secure confirmation that the user is allowed to access that data (e.g., without a password or username).

In another example embodiment where the MMIC radar 444 detects the user approaching, the location and movement tagged telemetry data produced from the MMIC radar 444 sensing this approaching is sent to the OS 438 via the EC 470 and integrated sensor hub 498 to initiate the execution of the BIOS and OS 438 in order to execute a wake process when the information handling system 400 had previously been placed in a sleep state as described herein. In this embodiment, when the tagged telemetry data is sent to the OS 438, the potential output from the execution of the privacy detect event module 466 may include restoring the wake state of the information handling system 400 to a predetermined state and/or allowing the data presented on the screen of the video display device to be displayed again. In an embodiment, the EC 470 may be active to operate the MMIC radar 444 while the information handling system 400 is in a sleep state or the BIOS or OS is not being executed. As such, the operation of the methods and systems herein may be independent of the execution of the BIOS or OS as described herein.

In an example embodiment, the MMIC radar 444 may be used to detect human presence of a plurality of humans at or near the information handling system 400. In this example embodiment, the user (e.g., authorized to access the information handling system 400) may be present at a mid-range distance from the MMIC radar 444 which indicates that the user is operating the information handling system 400. Additionally, the MMIC radar 444 may detect the presence of another human at, for example, a long-range such as behind the user potentially viewing what the user is doing on the information handling system 400 and capable of viewing the data presented on the video display device of the information handling system 400. Again, the MMIC radar 444 senses the position and trajectory of these two humans and may create location and movement tagged trajectory data describing the location and movement of these humans within the mid- and far-ranges. The OS 438 receives this tagged trajectory data from the MMIC radar 444 and provides the tagged telemetry data as input to the privacy detect event module 466. Potential output instructions from the execution of the privacy detect event module 466 based on this data may be that the OS 438 provide the user interface software 484 with a notification to the user that the data presented on the screen of the video display device. Other potential actions may be made under the instruction of the OS 438 may include the privacy event API 486 and OS input/output controller 497 executing similar functions described in connection with the user walking away from the information handling system 400 such as placing the information handling system 400 in an ACPI state or rendering the screen blank (e.g., locking screen).

In an embodiment, the location and movement tagged telemetry data produced by the MMIC radar 444 may be sent to the antenna controller 440 via a serial communication protocol (e.g., I$^2$C) and use it as input to an executed antenna proximity event algorithm 464. The antenna proximity event algorithm 464 may include a look-up table. This look-up table may include a number of triggers that may be used to define whether power may be increased, reduced, or turned off at one or more of the transceiving antennas 446-1, 446-2, 446-3, 446-4. These triggers may include, among others, the detected presence of a human, proximity of a human or user body part relative to an antenna 446-1, 446-2, 446-3, 446-4 and the information handling system 400, as well as any trajectory data related to the movement of the user or other humans relative to the information handling system 400 and the MMIC radar 444. These inputs may be treated as data points that adjust the power provided to the transceiving antennas 446-1, 446-2, 446-3, 446-4. The output of the look-up table may include instructions to the antenna controller 440 to protect the user from being subjected to high-frequency magnetic radiation from the transceiving antennas 446-1, 446-2, 446-3, 446-4. As described herein, the antenna proximity event algorithm 464 may alternatively or additionally be a machine learning service algorithm, that uses the inputs from the MMIC radar 444 to correlate those inputs to provide the instructions to adjust the power provide to the transceiving antennas 446-1, 446-2, 446-3, 446-4. Where a machine learning service is provided, the input may be provided wirelessly to processing resources provided across the network. In this example, embodiment, the antenna proximity event algorithm 464 may be remote from the information handling system 400 and trained remotely. In an embodiment, the antenna proximity event algorithm 464 may be a trained module sent to the information handling system 400 from these remote processing service after the antenna proximity event algorithm 464 had been trained remotely.

In these embodiments, the MMIC radar 444 may be used to detect the proximity of a user's hand 484 or other body part near an antenna 446-1, 446-2, 446-3, 446-4 and alter (e.g., increase, reduce, or turn off) power to a transmitting antenna 446-1, 446-2, 446-3, 446-4. The reduction or elimination of power to the transmitting antenna 446-1, 446-2, 446-3, 446-4 may be initiated if and when the user's hand 484 is within a certain proximity of the antenna 446-1, 446-2, 446-3, 446-4 (e.g., 2 cm). This may be done to set safe SAR levels for human contact. In an embodiment, the information handling system 400 may include a plurality of MMIC radars 444 for use with the antennas 446-1, 446-2, 446-3, 446-4 within the information handling system 400. With the MMIC radar 444 or multiple MMIC radars 444, a trajectory and position of the user's body may be detected relative any of the antennas 446-1, 446-2, 446-3, 446-4.

Where the human proximity (e.g., user's body close to antenna 446-1, 446-2, 446-3, 446-4) is detected within a proximity distance (e.g., set to 2 cm or less), the MMIC radar 4s44 may gather the trajectory and position data of the user's body relative to any affected antenna 446-1, 446-2, 446-3, 446-4. Here, again, the MMIC radar 444 uses its emitted microwave frequencies to detect the location of the user's body parts in real-time. Having scanned for human (e.g., user) proximity relative to an antenna 446-1, 446-2, 446-3, 446-4, the MMIC radar 444 may provide that tagged telemetry data to the antenna controller 440. Once received, the antenna controller 440 may use this tagged telemetry data as input into the antenna proximity event algorithm 464 with one potential output from the execution of the antenna proximity event algorithm 464 being the antenna controller 440 directing one or more of the cellular radio and front end 430-1 and Wi-Fi radio and front end 430-2 to increase, reduce, or eliminate power provided to an antenna 446-1, 446-2, 446-3, 446-4 used for transmission of data. An increase in power to the antenna 446 may be a result of a determination that the tagged telemetry data indicates a user's body is moving away from the antenna 446-1, 446-2, 446-3, 446-4. A reduction in power to the antenna 446-1, 446-2, 446-3, 446-4 may be a result of a determination that the tagged telemetry data indicates a user's body is moving towards the antenna 446-1, 446-2, 446-3, 446-4. An elimination of power provided to the antenna 446-1, 446-2, 446-3, 446-4 may be a result of a determination that the tagged telemetry data indicates a user's body is sufficiently close to the antenna 446-1, 446-2, 446-3, 446-4 that any reduction in power would not be sufficient to eliminate the health dangers the user may be subjected to. In order to maintain persistent wireless connectivity between the information handling system 400 and a wireless network, the output may also direct the data transceptions at any effected antenna 446-1, 446-2, 446-3, 446-4 affected by the reduction or elimination of power to be completed by another antenna 446-1, 446-2, 446-3, 446-4 or group of antennas 446-1, 446-2, 446-3, 446-4.

Where the output from the execution of the antenna proximity event algorithm 464 indicates that power is to be reduced or eliminated at any given antenna 446-1, 446-2, 446-3, 446-4, the EC 470 or antenna controller 440 may reference a power look-up table or other power reduction instructions in order to complete this process. In an embodiment, the cellular radio and front end 430-1 may include power adjustment tables 491 and antenna tuning instructions 492 that are referenced and used to reduce power to the cellular antennas 446-1 and 446-2. Because the power reduction to the cellular antennas 446-1 and 446-2 may be incremental, some relatively small power reductions may require the cellular antennas 446-1 and 446-2 to be tuned so that data transceptions may continue at those cellular antennas 446-1 and 446-2 albeit at a reduced power. Similarly, the Wi-Fi radio and front end 430-2 may be associated with a Wi-Fi power table 493 and a regulatory maximum power module 494 that based on the output from the antenna proximity event algorithm 464, adjusts the power to the Wi-Fi antennas 446-2, 446-3 and sets a maximum power limit to those Wi-Fi antennas 446-2, 446-3. The antenna tuning instructions 492, power adjustment tables 491, Wi-Fi power table 493, and regulatory maximum power module 494 may be formed on the chipsets of the cellular radio and front end 430-1 and Wi-Fi radio and front end 430-2 respectively or may be located elsewhere within the information handling system 400. The antenna controller 440 may communicate with the cellular radio and front end 430-1 and Wi-Fi radio and front end 430-2 using a side band serial messaging protocol 442 via a side band communication.

In yet another context of a user using the information handling system 400, the operation of the MMIC radar 444 may detect a user's gesture 495. A gesture 495 may be a predefined movement of the user's body that may indicate that a specific action to be taken by the information handling system 400. For example, a gesture may allow the user, when detected as being present in front of the information handling system 400, to interact with output presented at the video display device 410. The MMIC radar 444 is used to detect the vector movements of the user's hand, for example, and processes those signals using machine learning techniques that can classify those gestures. During operation and after the MMIC radar 444 has detected movement by the user, the tagged telemetry data may be provided to a machine learning gesture detect algorithm 468 as input. The machine learning gesture detect algorithm 468 may classify this detected movement of the user to determine if a predetermined gesture is being presented by the user. Where the machine learning gesture detect algorithm 468 determines that a gesture has been detected, the output may be presented to the processor to implement that output from the machine learning gesture detect algorithm 468 as input to the information handling system 400. For example, a user may have a streaming application being executed on the information handling system 400. A user may provide input to the execution of the streaming application using gestures. For example, where the user wants to advance the runtime of a video being played by the streaming application, a user may swipe a finger in the air. The MMIC radar 444 detects this movement and, in addition to providing this tagged telemetry data to the antenna proximity event algorithm 464 as described herein, provides this data to the machine learning gesture detect algorithm 468 as well. Similar to the antenna proximity event algorithm 464, the machine learning gesture detect algorithm 468 may be either executed at the information handling system 400 or remotely on a server that includes computing resources. In this example, embodiment, the antenna proximity event algorithm 464 may be remote from the information handling system 400 and trained remotely. In an embodiment, the machine learning gesture detect algorithm 468 may be a trained module sent to the information handling system 400 from these remote processing service after the machine learning gesture detect algorithm 468 had been trained. During operation and when the machine learning gesture detect algorithm 468 provides output indicating that a gesture has been detected, this gesture data may be provided to the processor or EC 470 for the processor or EC 470 to execute at, for example, an application executed on the information handling system 400.

The information handling system 400 may also include an integrated sensor hub 498. The integrated sensor hub 498 may be used by the MMIC radar 444 and antenna controller 440 with the antenna proximity event algorithm 464 to provide additional data from additional sensors in the information handling system 400. For example, the information handling system 400 may include a number of proximity sensors associated with each of the antennas 446-1, 446-2, 446-3, 446-4. The integrated sensor hub 498 may further include other sensors such as a Hall effect sensor, a magnetometer, a proximity sensor, a hinge sensor, a light sensor, and a camera, among other sensors. In an embodiment, these variety of sensors may also include an accelerometer, a gyroscope, an orientation sensor in addition to these other sensors. The integrated sensor hub 498 may be a central location that controls and receives input from these proximity sensors and other sensors. When the MMIC radar 444 is detecting proximity of a user's hand 484 near one or more of the antennas 446-1, 446-2, 446-3, 446-4, the proximity sensor data may be provided to the MMIC radar 444 and/or antenna controller 440 to be used as input to confirm that the user's hand 484 is close to the antennas 446-1, 446-2, 446-3, 446-4 and the detected distance between the user's hand 484 and the antenna 446-1, 446-2, 446-3, 446-4.

The systems and methods described herein provide for multi-purpose radar sensing with tagged telemetry data used to detect human presence for privacy purposes, human or user body part proximity for SAR exposure, and an ability to "wake" the information handling system 400 when the user approaches the information handling system 400 or "locks" the information handling system 400 as the user walks away from the information handling system 400. Instead of relying on a plurality of radar sensors to detect human proximity, human presence, and user gestures, the MMIC radar may be used to provide a single source from which human proximity, human presence, and user gestures can be detected. This reduces the number of parts within the information handling system 400, saves space within the housing of the information handling system 400, reduces the cabling used for dedicated antenna proximity sensors, for example, and saves on manufacturing costs. Still further, the MMIC radar 444 may be used to detect and differentiate between humans who are close (e.g., a user) to the information handling system 400 within a near proximity of the information handling system 400 as well as those humans who are further away from the information handling system 400 and could be violating the privacy of the user in relation to the data presented on the screen of the video display device. The MMIC radar 444 is also used to detect a proximity of the user's body parts close to the antennas and thereby uses that data to help reduce or eliminate power to the effected antennas so that the SAR limits may be reduced in order to not hurt the user. This may be particularly important where certain antennas are operating at higher frequencies (e.g., 5 GHz and above).

Figure 5:
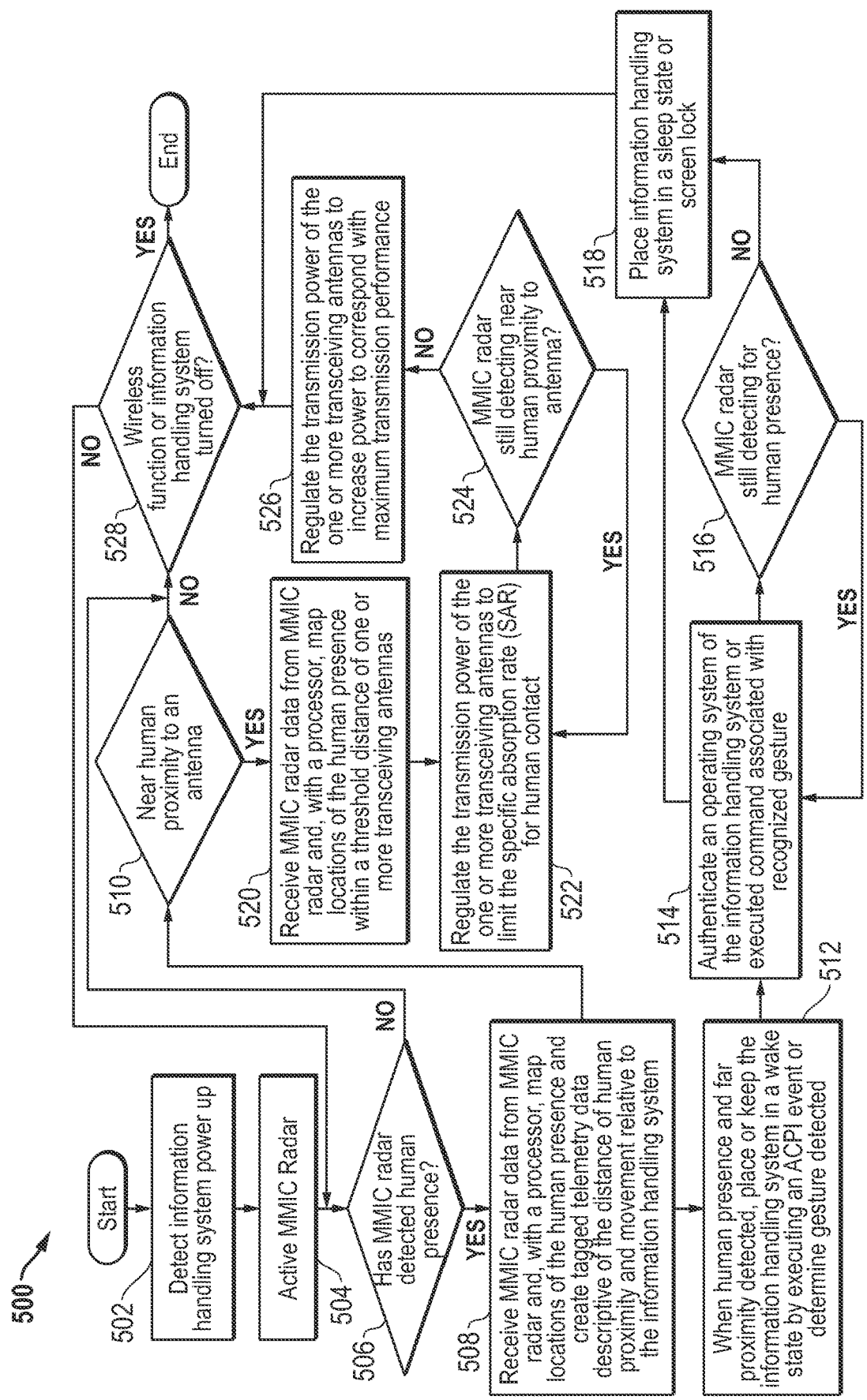
FIG. 5 is a flow diagram illustrating a method of executing an antenna proximity sensing system with privacy and presence sensing or gesture detection by an information handling system according to an embodiment of the present disclosure.

FIG. 5 is a flow diagram illustrating a method 500 of executing an antenna proximity sensing system with, optionally privacy and presence sensing, gesture detection, or both by an information handling system according to an embodiment of the present disclosure. The method 500 may be executed by and information handling system similar to that described in connection with FIGS. 1, 3, and 4 or a combination of information handling systems. In an embodiment, the information handling system includes one or more antennas with each antenna being operated using a radio and radio frequency front end to transceive data wirelessly with a network such as those described in connection with FIG. 1, for example.

The method 500 may begin with detecting a power up sequence at the information handling system 502. In this embodiment, a processor or embedded controller (EC), for example, may detect this initiation of power at the information handling system. The powering up of the information handling system may be initiated by a user actuating a power switch at the information handling system.

The method 500 includes, at block 504, with activating an MMIC radar. The MMIC radar may be activated under the instruction of the EC such that the operation of the MMIC radar is independent of the execution of the BIOS or OS of the information handling system. This may allow the MMIC radar to remain activated and sensing human proximity and/or human presence during, for example, the execution of an advanced configuration and power interface (ACPI) event that includes placing the information handling system in a power state that includes one of a sleep state, a hibernation state, a standby state, or a power down state during execution of the method 500 described herein.

The method 500 further includes, at block 506, determining if the MMIC radar has detected human presence. As described herein, the MMIC radar is a type of integrated circuit that operates at, for example, microwave frequencies (e.g., 300 MHz to 300 GHz) and, in the context of the present specification, is used to scan for human presence around the information handling system as well as scan for human proximity near any of the plurality of transceiving antennas of the information handling system. The human presence is detected by the MMIC radar which may be used as a radar system for sensing the environment within and around the information handling system including a detection of an object that is the size of a human and moves relative to the information handling system like a human. This detected human presence may be used by the operation of the antenna controller or other processor to map the location of a human, including the user, relative to the information handling system/MMIC radar. In an embodiment, the human presence detected may include the presence of multiple humans. As described herein, the human presence may detect the presence of one human (e.g., a user sitting in front of the information handling system) or the presence of multiple humans (e.g., the user sitting in front of the information handling system and another person looking at or capable to viewing the data presented on the screen of the video display device).

Where human presence is not detected, the method 500 may continue at block 528 with determining if the wireless functions of the information handling system has been turned off. Where either have been turned off, the method 500 may end. Where both the wireless functions and the information handling system are turned on, the method 500 may go back to detecting for human presence at block 506.

Where human presence is detected, the method 500 may continue at block 508 by receiving MMIC radar data from the MMIC radar and, with a processor, mapping location of the human presence to create tagged telemetry data descriptive of the distance of human proximity and movement relative to the information handling system and one or more of its components such as one or more transceiving antennas.

Again, the detection of human presence may include the detection of one or more humans at or near the information handling system, one of which may be a user. The ranges of these detected humans may indicate whether the human is the user (e.g., sitting in front of the information handling system), whether the user is approaching the information handling system (e.g., human detected in front of information handling system and coming closer), whether the user is walking away from the information handling system (e.g., human presence detected and moving away from MMIC radar), or whether the one or more humans are relatively stationary. Further, the MMIC radar may detect both human presence such as movement but also proximity of human movement which may be used to determine gestures intended by the user as input via the MMIC radar system.

The method 500 describes an instance where the MMIC radar has detected human presence that is coming closer to the information handling system. In this example embodiment, the information handling system is in a sleep state, hibernation state, a standby state, or a power down state and the detection of the user as a result, in an embodiment of a prior detection that the user had walked away from the information handling system. In this example embodiment, the user may have interfaced with a security application executing a privacy event application programming interface (API) and set a preferred action to be taken when the MMIC radar had detected that the user had walked away from the information handling system. In this example, the user had selected an ACPI state to place the information handling system in and, by leaving the information handling system, the ACPI state was initiated. The preferences made at the security application may be executed by the antenna controller, user interface software, and privacy event API accordingly. In an embodiment, the antenna controller may also had interfaced with an OS input/output controller to prevent input/output devices from providing input to wake or otherwise provide access to the data on the information handling system without secure confirmation that the user is allowed to access that data (e.g., without a password or username).

The method 500 describes an instance where the MMIC radar has detected human presence and human motion that may constitute a gesture intended to be a command executed to control a software application according to an optional embodiment herein. The MMIC data may be provided to a trained machine learning gesture detect algorithm operating with the OS to classify the gesture and correlate the gesture with a command for an executing software application in some embodiments. In such an example, near or mid tagged MMIC radar telemetry data may be provided via the integrated sensor hub as input for the trained machine learning gesture detect algorithm to interpret motion detected as gestures.

In an embodiment this tagged telemetry data may be categorized into near or far proximity data, or a greater number of proximity tagged categories in other embodiments and sent to an antenna controller via a sideband communication and the antenna controller may execute an antenna proximity event algorithm using this tagged telemetry data for near proximity data as input. As output, the antenna controller may be directed to execute the antenna proximity event algorithm to protect a user's health if and when the user's body is close to an antenna. The human presence data received by MMIC radar may be used to limit the specific absorption rate (SAR) for human contact by redirecting the transmissions of any given antenna or turning off an antenna near the user's body.

In this example embodiment, at block 512, the approach of the human towards the information handling system, when human presence and far-proximity human presence is detected, places the information handling system in a wake state via execution of the ACPI events as described herein. Again, this may be accomplished due to the MMIC radar being powered on independent of the processor executing the BIOS and OS of the information handling system. As the MMIC radar detects this human presence and that the human is approaching the information handling system, the MMIC radar may coordinate with an EC to initiate the BIOS and/or OS to place the information handling system in this wake state in preparation for use by the user.

In another optional embodiment, the detected human presence and human motion that may constitute a gesture intended to be a command executed to control a software application. The MMIC data may be provided to a trained machine learning gesture detect algorithm operating with the OS at 512 which may classify the gesture to identify a type of gesture and correlate the gesture with a command for an executing software application in some embodiments.

In order to maintain security of the data maintained on the information handling system, the method 500 may continue at block 514 with authenticating an operating system of the information handling system. This may include presenting a security prompt on the screen of the video display device requesting user login information such as a username and/or password.

In order to utilize the gesture detection system with the MMIC radar system in such embodiments, the information handling system OS and machine learning gesture detect algorithm may generate a command for an executing software application based on the classified gesture and correlated command. Such a command may then be utilized by the OS and an input/output command in an example embodiment to execute a function on the software application. For example, a detected motion of a finger or a hand by the MMIC as interpreted by the machine learning gesture detect algorithm may continue play or stop play of a video in a video playback or streaming application.

At this point, the method 500 may continue to block 516 with determining whether the MMIC radar is still detecting for human presence. Where human presence is still detected at block 516, the method 500 returns to confirming the authentication of the OS or continuing with gesture detection at block 514. Where human presence is not detected anymore by the MMIC radar at block 516, the method 500 continues to block 518 with placing the information handling system in a sleep state and/or screen lock by executing the ACPI event as described herein when that triggers a privacy event requiring the same. As described herein, the MMIC radar may detect a user walking away from the information handling system and may not detect that human presence anymore. At this point, in order to secure the data on the information handling system as well as not present the images on the screen of the video display device, the ACPI may prevent unauthorized access by initiating this ACPI event.

At either block 514 or block 516, the method 500 may continue at block 528 with determining if the wireless functions of the information handling system have been turned off. Where either have been turned off, the method 500 may end. Where both the wireless functions and the information handling system are turned on, the method 500 may go back to detecting for human presence at block 506.

It is appreciated that the step of monitoring for human presence detected at block 506 may be a detection that a human such as the user is leaving the information handling system as described in connection with block 518. This again, when presence and far proximity of humans is not detected, places the information handling system in a sleep state awaiting a time when human presence is detected and the information is placed in a wake state once more as described in connection with the privacy event detection portion of block 512. Therefore, although the method 500 depicted in FIG. 5 shows the information handling system in a sleep state initially, it is appreciated that the initial state may be a wake state and that the information handling system may be placed in a sleep state if and when the MMIC radar detects the user is leaving the information handling system.

Where human presence is detected the MMIC radar location and movement tagged telemetry data is sent to the antenna controller as described herein at block 508 when for example, the MMIC radar has detected near human proximity. Again, using the MMIC radar's capabilities, the MMIC radar may detect a user's body parts close to any of the antennas of the information handling system as described further at block 510 below.

At block 510, the near proximity data is used to determine that a human is detected near at least one location of an antenna by the antenna proximity event algorithm, the method may continue at block 520 with processing the MMIC radar data from the MMIC radar and, with a processor, map locations of the human presence within a threshold distance of known locations for one or more transceiving antennas. As described herein, where the human proximity (e.g., user's body close to antenna) is determined by the antenna proximity event algorithm within a proximity distance threshold of an antenna (e.g., set to 2 cm or less), the MMIC radar may gather the trajectory and position data of the user's body relative to any affected antenna. Such determinations may be adjusted by the antenna proximity event algorithm or by the MMIC radar telemetry data to adjust for any variation of the MMIC radar position, angle or the like relative to the mounted location on a display screen chassis in an example embodiment or any other mounting location. Here, again, the MMIC radar uses its emitted microwave frequencies to detect the location of the user's body parts in real-time. Having scanned for human (e.g., user) proximity relative to an antenna, the antenna proximity event algorithm may prepare an adjustment via the antenna controller to one or more correlating antennas having a human proximity detected within a threshold distance.

Where the antenna proximity event algorithm does not detect a human proximity near an, the method 500 may continue at block 528 with determining if the wireless functions of the information handling system or the information handling system has been turned off. Where either has been turned off, the method 500 may end. Where both the wireless functions and the information handling system remain on, the method 500 may go back to detecting for human presence at block 506.

When human proximity is detected and mapped, the method 500 may regulate the transmission power of the one or more transceiving antennas where a human body part is detected by the antenna proximity event algorithm within a threshold distance of an antenna, to limit the specific absorption rate for human contact at that antenna at block 522. As described herein, the antenna controller may execute an antenna proximity event algorithm and use this MMIC telemetry data for human proximity data as input into the antenna proximity event algorithm. In an embodiment, the antenna proximity event algorithm may include a look-up table. This look-up table may include a number of triggers that may be used to define whether or not the transmission power of any of the antennas should be lowered or turned off as described herein. These triggers may include, among others, the detected presence of a human, proximity of a human or user body part relative to an antenna and the information handling system, a heartbeat detected by the MMIC radar, as well as any trajectory data related to the movement of the user or other humans relative to the antenna and the information handling system. The output of the look-up table may include instructions to the antenna controller that an antenna proximity detect event has occurred and an antenna power adjustment instruction is needed in order to protect a user. Where the antenna proximity event algorithm is a machine learning service algorithm, these inputs may be used to correlate these various inputs and provide the antenna power adjustment instructions as output in order to dynamically control the power levels of affected antennas in the information handling system pursuant to an antenna proximity event detection. Where a machine learning service is provided, the input may be provided wirelessly to processing resources provided across the network. In this example, embodiment, the antenna proximity event algorithm may be remote from the information handling system and trained remotely. In an embodiment, the antenna proximity event algorithm may be a trained module sent to the information handling system from these remote processing service after the antenna proximity event algorithm had been trained. In an embodiment, both the machine learning service algorithm and look-up table may be used with different inputs and determined outputs being added to the look-up table based on the classifier of the machine learning algorithm adjusting the table based on its past output performance feedback. Such antenna proximity detection as conducted by the antenna controller may occur along with privacy detection events or gesture detection as conducted by the embedded controller or OS of the information handling system while sharing use of the MMIC radar telemetry data for human presence and proximity.

At block 524, the method 500 then determines whether the MMIC radar is still detecting near human proximity to the antenna. Where is it, the method 500 may be continued to be reduced (or even eliminated) per block 522. Where, at block 524, it is determined that human proximity is not detected by the MMIC radar or is not detected within a threshold distance of the location of an antenna, the method 500 may continue at block 526 with regulating transmission power of the one or more antennas to increase power to correspond with maximum transmission performance. Where the transception power has been increased after no detection of human proximity or human proximity is not detected within a threshold distance of the location of an antenna, the method 500 may continue at block 528 with determining if the wireless functions of the information handling system have been turned off. Where either have been turned off, the method 500 may end. Where both the wireless functions and the information handling system are turned on, the method 500 may go back to detecting for human presence at block 506.

It is appreciated that the method 500 includes a detection of both human presence and human proximity and antenna proximity detection may be conducted by the antenna controller while privacy detection or gesture detection also occurs using an embedded controller or processor and OS. Accordingly, the antenna proximity detection, privacy detection, or gesture detection may be independent of each other and may operate simultaneously in some embodiments. In some embodiments, the antenna proximity detection, privacy detection, or gesture detection may utilize shared MMIC radar tagged telemetry data for execution of these functions.

Figure 6:
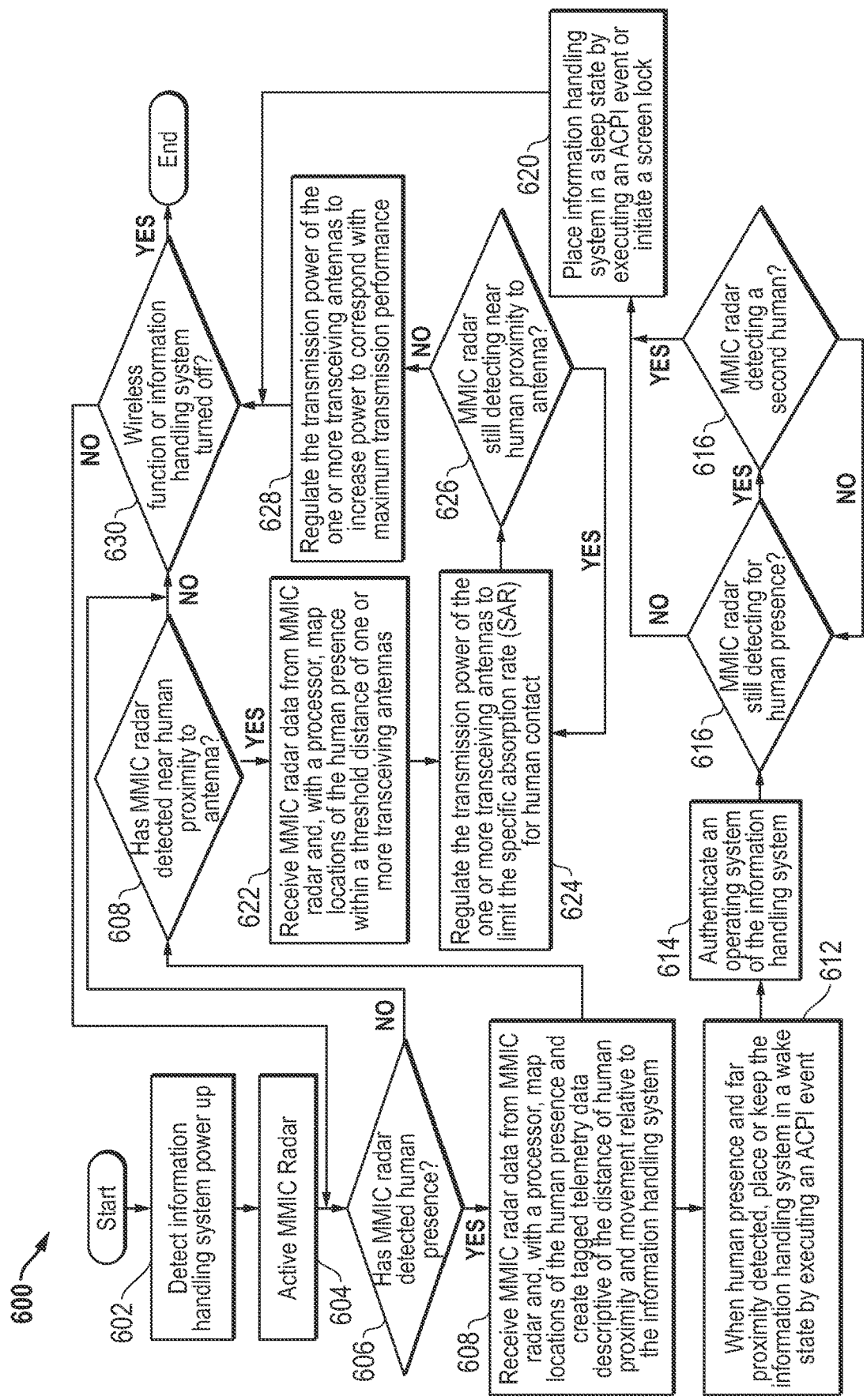
FIG. 6 is a flow diagram illustrating a method of executing an antenna proximity sensing system with privacy and presence sensing by an information handling system according to another embodiment of the present disclosure.

FIG. 6 is a flow diagram illustrating a method of executing an antenna proximity sensing system with privacy and presence sensing by an information handling system according to another embodiment of the present disclosure. The method 600 may be executed by and information handling system similar to that described in connection with FIGS. 1, 3, and 4 or a combination of information handling systems. In an embodiment, the information handling system includes one or more antennas with each antenna being operated using a radio and radio frequency front end to transceive data wirelessly with a network such as those described in connection with FIG. 1, for example.

The method 600 may begin with detecting a power up sequence at the information handling system 602. In this embodiment, a processor or embedded controller (EC), for example, may detect this initiation of power at the information handling system. The powering up of the information handling system may be initiated by a user actuating a power switch at the information handling system.

The method 600 includes, at block 604, with activating an MMIC radar. The MMIC radar may be activated under the instruction of the EC such that the operation of the MMIC radar is independent of the execution of the BIOS or OS of the information handling system. This may allow the MMIC radar to remain activated and sensing human proximity and/or human presence during, for example, the execution of an advanced configuration and power interface (ACPI) event that includes placing the information handling system in a power state that includes one of a sleep state, a hibernation state, a standby state, or a power down state during execution of the method 500 described herein.

The method 600 further includes, at block 606, determining if the MMIC radar has detected human presence. As described herein, the MMIC radar is a type of integrated circuit that operates at, for example, microwave frequencies (e.g., 300 MHz to 300 GHz) and, in the context of the present specification, is used to scan for human presence around the information handling system as well as scan for human proximity near any of the plurality of transceiving antennas of the information handling system. The human presence is detected by the MMIC radar which may be used as a radar system for sensing the environment within and around the information handling system including a detection of an object that is the size of a human and moves relative to the information handling system like a human. This detected human presence may be used by the operation of the antenna controller or other processor to map the location of a human, including the user, relative to the information handling system/MMIC radar. In an embodiment, the human presence detected may include the presence of multiple humans. As described herein, the human presence may detect the presence of one human (e.g., a user sitting in front of the information handling system) or the presence of multiple humans (e.g., the user sitting in front of the information handling system and another person looking at or capable to viewing the data presented on the screen of the video display device).

Where human presence is not detected, the method 600 may continue at block 630 with determining if the wireless functions of the information handling system has been turned off. Where either have been turned off, the method 600 may end. Where both the wireless functions and the information handling system are turned on, the method 600 may go back to detecting for human presence at block 606.

Where human presence is detected, the method 600 may continue at block 608 by receiving MMIC radar data from the MMIC radar and, with a processor, mapping location of the human presence to create tagged telemetry data descriptive of the distance of human proximity and movement relative to the information handling system and one or more components such as one or more transceiving antennas. Again, the detection of human presence may include the detection of one or more humans at or near the information handling system, one of which may be a user. The ranges of these detected humans may indicate whether the human is the user (e.g., sitting in front of the information handling system), whether the user is approaching the information handling system (e.g., human detected in front of information handling system and coming closer), whether the user is walking away from the information handling system (e.g., human presence detected and moving away from MMIC radar), or whether the one or more humans are relatively stationary. The method 600 describes an instance where the MMIC radar has detected human presence that is coming closer to the information handling system. In this example embodiment, the information handling system is in a sleep state, hibernation state, a standby state, or a power down state and the detection of the user as a result, in an embodiment of a prior detection that the user had walked away from the information handling system. In this example embodiment, the user may have interfaced with a security application executing a privacy event application programming interface (API) and set a preferred action to be taken when the MMIC radar had detected that the user had walked away from the information handling system. In this example, the user had selected an ACPI state to place the information handling system in and, by leaving the information handling system, the ACPI state was initiated. The preferences made at the security application may be executed by the antenna controller, user interface software, and privacy event API accordingly. In an embodiment, the antenna controller may also had interfaced with an OS input/output controller to prevent input/output devices from providing input to wake or otherwise provide access to the data on the information handling system without secure confirmation that the user is allowed to access that data (e.g., without a password or username).

In an embodiment this tagged telemetry data may be sent to an antenna controller via a sideband communication and the antenna controller may execute an antenna proximity event algorithm using this tagged telemetry data as input. As output, the antenna controller may be directed to execute the antenna proximity event algorithm to protect a user if and when the user's body is close to an antenna. The human presence data received by MMIC radar may be used to limit the specific absorption rate (SAR) for human contact by redirecting the transmissions of any given antenna or turning off an antenna near the user's body.

In this example embodiment, at block 612, when human presence and far proximity of that human is detected, the approach of the human towards the information handling system places the information handling system in a wake state via execution of the ACPI events as described herein. Again, this may be accomplished due to the MMIC radar being powered on independent of the processor executing the BIOS and OS of the information handling system. As the MMIC radar detects this human presence and that the human is approaching the information handling system, the MMIC radar may coordinate with an EC to initiate the BIOS and/or OS to place the information handling system in this wake state in preparation for use by the user.

In order to maintain security of the data maintained on the information handling system, the method 600 may continue at block 614 with authenticating an operating system of the information handling system. This may include presenting a security prompt on the screen of the video display device requesting user login information such as a username and/or password.

At this point, the method 600 may continue to block 616 with determining whether the MMIC radar is still detecting for human presence. Where human presence is still detected at block 616, the method 600 continues to block 618 to determine whether the MMIC radar is detecting a second human. As described herein, the MMIC radar may be capable of determining short-, intermediate-, and long-range detections of humans. In this example embodiment, because human presence has been detected initially, a second human presence may indicate to the information handling system executing a n that the second human may be intruding on the privacy of the user's content displayed at a screen of the video display device. Where a second human is detected, the method 600 may continue to block 620 with placing the information handling system in a sleep state by executing the ACPI event via the privacy detect event module. Alternatively, the user may be presented with a notice on the screen that a second human has been detected and that the user should be aware of the potential privacy violation that may entail. At this point, the method 600 may continue at block 630 with determining if the wireless functions of the information handling system have been turned off. Where either have been turned off, the method 600 may end. Where both the wireless functions and the information handling system are turned on, the method 600 may go back to detecting for human presence at block 606.

Where a second human is not detected at block 618, the method 600 returns to confirming the authentication of the OS at block 614. Where human presence is not detected anymore by the MMIC radar at block 616, the method 500 continues to block 620 with placing the information handling system in a sleep state by executing the ACPI event as described herein. In another embodiment, the method may lock the display screen without necessarily entering a sleep state. As described herein, the MMIC radar may detect a user walking away from the information handling system and may not detect that human presence anymore. At this point, in order to secure the data on the information handling system as well as not present the images on the screen of the video display device, the ACPI may prevent unauthorized access by initiating this ACPI event or screen lock.

As the information handling system is in a sleep state, the method 600 may continue at block 628 with determining if the wireless functions of the information handling system have been turned off. Where either have been turned off, the method 600 may end. Where both the wireless functions and the information handling system are turned on, the method 600 may go back to detecting for human presence at block 606.

It is appreciated that the human presence detected at block 606 may include a detection that a human such as the user is leaving the information handling system, or a human absence, as described in connection with block 620. This again places the information handling system in a sleep state awaiting a time when human presence is detected and the information is placed in a wake state once more as described in connection with block 612 when human presence and far proximity of that human is detected. Therefore, although the method 600 depicted in FIG. 6 shows the information handling system in a sleep state initially, it is appreciated that the initial state may be a wake state and that the information handling system may be placed in a sleep state if and when the MMIC radar detects the user is leaving the information handling system.

Where human presence is detected at 606, the method may send the location and movement tagged telemetry data to the antenna controller as indicated at block 608, particularly when near human proximity data is among the tagged telemetry data from the MMIC radar. Using the MMIC radar's radar capabilities, the MMIC radar data may be used by the antenna controller executing the antenna proximity event algorithm to compare the location of a user's body parts and proximity relative to any of the antennas, which have known locations in the antenna proximity event algorithm across the information handling system at block 610. The antenna proximity event algorithm receives the MMIC radar telemetry data and compares the human proximity data with known locations of antenna on the information handling system or to other components such as a touchpad or keyboard with known location near antennas to determine if a human is detected proximate to any antenna.

Where human presence is not detected near any antenna at block 610, the method 600 may continue at block 630 with determining if the wireless functions or the information handling system has been turned off. Where either have been turned off, the method 600 may end. Where both the wireless functions and the information handling system remain on, the method 600 may go back to detecting for human presence at block 606.

Where proximity of a human is detected near at least one antenna at block 610, the method may continue at block 622 with processing MMIC radar data from the MMIC radar by the antenna proximity event algorithm and, with the antenna controller or other processor, map locations of the human within a threshold distance of one or more transceiving antenna. As described herein, where the human proximity (e.g., user's body close to antenna) is detected within a proximity distance threshold of an antenna (e.g., set to 2 cm or less), the MMIC radar may gather the trajectory and position data of the user's body relative to any affected antenna. Here, again, the MMIC radar uses its emitted microwave frequencies to detect the location of the user's body parts in real-time. With the antenna proximity event algorithm having scanned for human (e.g., user) proximity relative to an antenna known location within the MMIC radar field, the antenna controller may identify a need for mitigation of power levels at a correlating antenna as discussed below.

When human proximity is detected and mapped within a threshold distance of an antenna, the method 600 may continue to regulate the transmission power of the one or more transceiving antennas to limit the specific absorption rate for human contact at block 624. As described herein, the antenna controller may execute an antenna proximity event algorithm and use this human presence data as input into the antenna proximity event algorithm. In an embodiment, the antenna proximity event algorithm may include a look-up table. This look-up table may include a number of triggers that may be used to define whether or not the transmission power of any of the antennas should be lowered or turned off which antenna correlates to the detected location of the detected human body part as described herein. These triggers may include, among others, the detected presence of a human, proximity of a human or user body part relative to the known antenna location on the information handling system, a heartbeat detected by the MMIC radar, as well as any trajectory data related to the movement of the user or other humans relative to the antenna and the information handling system. These inputs may be treated as data points that are correlated with an antenna proximity detect event to be conducted by antenna proximity event algorithm in real-time. The output of the look-up table may include instructions to the antenna controller instructing the antenna controller to execute a privacy detect event in order to protect a user and secure the information handling system and its data. Multiple sets out of outputs defining the one or more antenna proximity detection events at plural antennas or repeatedly at individual antennas may be sent out by the antenna controller. Where the antenna proximity event algorithm is a machine learning service algorithm, these inputs may be used to correlate these various inputs and provide the antenna proximity detect event instructions as output in order to dynamically control the power levels of antennas on the information handling system. Where a machine learning service is provided, the input may be provided wirelessly to processing resources provided across the network. In this example, embodiment, the antenna proximity event algorithm may be remote from the information handling system and trained remotely. In an embodiment, the antenna proximity event algorithm may be a trained module sent to the information handling system from these remote processing service after the antenna proximity event algorithm had been trained. In an embodiment, both the machine learning service algorithm and look-up table may be used with different inputs and determined outputs being added to the look-up table based on the classifier of the machine learning algorithm adjusting the table based on its past output performance feedback.

At block 626, the method 600 then determines whether the MMIC radar is still detecting near human proximity to the antenna. Where is it, the method 600 may be continued to be reduced (or even eliminated) per block 624. Where, at block 626, it is determined that human proximity is not detected by the MMIC radar or is not detected within a threshold distance of the location of the antenna, the method 600 may continue at block 628 with regulating transmission power of the one or more antennas to increase power to correspond with maximum transmission performance. Where the transception power has been increased after no detection of human proximity or human proximity is not detected within a threshold distance of the location of the antenna, the method 600 may continue at block 630 with determining if the wireless functions of the information handling system have been turned off. Where either have been turned off, the method 600 may end. Where both the wireless functions and the information handling system are turned on, the method 600 may go back to detecting for human presence at block 606.

It is appreciated that the method 600 includes a detection of both human presence and human proximity without a determination that either human presence or human proximity is or is not present. Accordingly, the detection of human presence and the detection of human proximity may be independent of each other. In some embodiments, the detection of human proximity without the detection of human presence may be used to determine if other objects are near an antenna in order to trigger a SAR detection and reduction of power to the effected antenna.

The blocks of the flow diagrams of FIGS. 5 and 6 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a processor;
   a memory;
   a power management unit (PMU);
   a wireless interface adapter for communicating, via a plurality of transceiving antennas operated by one or more radio frequency (RF) subsystems on a plurality of operating wireless links;
   a monolithic microwave integrated circuit (MMIC radar) to:
      scan for human presence around the information handling system;
      scan for human proximity near any of the plurality of transceiving antennas; and
      map human presence and proximity of humans to create tagged telemetry data descriptive of the distance of human proximity and movement;
   an antenna controller to receive, via a sideband communication executed by the wireless interface adapter, the tagged telemetry data and execute an antenna proximity event algorithm using the tagged telemetry data as input to protect a user by comparing the human proximity and movement relative to locations of the plurality of transceiving antennas on the information handling system; and
   an operating system to execute code instructions of a privacy detect event module to determine human presence or absence before the information handling system from the tagged telemetry data of the MMIC radar to identify a privacy detect event to secure the information handling system.

2. The information handling system of claim 1 further comprising the privacy detect event module to execute, via an embedded controller, an advanced configuration and power interface (ACPI) event that includes placing the information handling system in a power state that includes one of a sleep state, a hibernation state, a standby state, or a power down state.

3. The information handling system of claim 1 further comprising the antenna proximity event algorithm to send instructions to a radio to regulate the transmission power of at least one transceiving antenna operatively coupled to the radio to limit the specific absorption rate (SAR) for human contact.

4. The information handling system of claim 1 further comprising the privacy detect event module configured to wake, via an embedded controller, the information handling system from a sleep state and authenticating the operating system when the MMIC radar detects, via radar, the presence of a human within a threshold distance of the information handling system.

5. The information handling system of claim 1 further comprising the privacy detect event module configured to detect the presence of a plurality of humans and, via the user interface software, cause a display device of the information handling system to be locked.

6. The information handling system of claim 1 further comprising, with the MMIC radar, the processor to execute a machine learning gesture detect algorithm configured to detect a gesture from a human and, via the user interface software, execute a command with an executing software application.

7. The information handling system of claim 1 further comprising the MMIC radar to detect the presence of a human within a short range, a mid-range, and a long range to create the tagged telemetry data descriptive of the distance of human proximity and movement.

8. A method implemented at an information handling system comprising:
with a wireless interface adapter, establishing a wireless connection via a plurality of transceiving antennas operated by one or more radio frequency (RF) subsystems with a wireless network;
with a monolithic microwave integrated circuit (MMIC radar):
scanning for human presence around the information handlings system;
scanning for human proximity near any of the plurality of transceiving antennas;
mapping human presence and proximity of humans to create tagged telemetry data descriptive of the distance of human proximity and movement relative to the plurality of transceiving antennas;
with an antenna controller, receiving, via a sideband communication executed by the wireless interface adapter, the tagged telemetry data and executing instructions of an antenna proximity event algorithm using the tagged telemetry data as input to determine specific absorption rate (SAR) proximity of a human to at least one antenna of the plurality of transceiving antennas; and
with an operating system, executing instructions a privacy detect event module to protect user data privacy and secure the information handling system with the tagged telemetry data of the MMIC radar.

9. The method implemented at an information handling system of claim 8 further comprising the privacy detect event module including executing, via an embedded controller, to cause an advanced configuration and power interface (ACPI) event that includes placing the information handling system in a power state that includes one of a sleep state, a hibernation state, a standby state, or a power down state.

10. The method implemented at an information handling system of claim 8 further comprising the antenna proximity event algorithm including executing instructions at a radio to regulate the transmission power of the plurality of transceiving antennas operatively coupled to the radio to limit the SAR for human contact at the at least one antenna.

11. The method implemented at an information handling system of claim 8 further comprising the privacy detect event module waking, via an embedded controller, the information handling system from a sleep state when the MMIC radar detects the presence of a human within a threshold distance of the information handling system.

12. The method implemented at an information handling system of claim 8 further comprising, with the MMIC radar tagged telemetry data, executing instructions of a machine learning gesture detect algorithm detecting a gesture from a human and, via the user interface software, correlating the gesture with a command for execution at an operating software application on the information handling system.

13. The method implemented at an information handling system of claim 8 further comprising the MMIC radar detecting the presence of a human within a short range, a mid-range, and a long range to create the tagged telemetry data descriptive of the distance of human proximity and movement.

14. The method implemented at an information handling system of claim 8 further comprising the antenna proximity event algorithm determining from the tagged telemetry data from the MMIC radar the location of the human compared to known locations of the plurality of transceiving antennas to determine if the human is within a threshold distance from the at least one antenna for SAR safety limitation of antenna power.

15. An information handling system including a privacy and presence sensing system comprising:
a processor;
a memory;
a power management unit (PMU);
a wireless interface adapter for communicating, via a plurality of transceiving antennas operated by one or more radio frequency (RF) subsystems on a plurality of operating wireless links;
a monolithic microwave integrated circuit (MMIC radar) to:
scan for human presence around the information handling system;
scan for human proximity near any of the plurality of transceiving antennas; and
scan for a gesture from a human;
the processor to map human presence and proximity of humans with tagged telemetry data descriptive of the distance of human proximity and movement relative to the plurality of transceiving antennas and information handling system;
an antenna controller to receive, via a sideband communication executed by the wireless interface adapter, the tagged telemetry data and execute an antenna proximity event algorithm using the tagged telemetry data as input to determine human proximity within a threshold distance of at least one antenna of the plurality of transceiving antennas; and
an operating system to execute a machine learning gesture detect algorithm to use the tagged telemetry data of the MMIC radar to identify a gesture from a user in front of the information handling system.

16. The information handling system of claim 15 further comprising a privacy detect event module to execute, via an embedded controller, an advanced configuration and power interface (ACPI) event that includes placing the information handling system in a power state that includes one of a sleep state, a hibernation state, a standby state, or a power down state when human absence is detected relative to the information handling system.

17. The information handling system of claim 15 further comprising the antenna proximity event algorithm to send instructions to a radio to regulate the transmission power of the at least one antenna of the plurality of transceiving antennas to limit the specific absorption rate (SAR) for human contact from the at least one antenna.

18. The information handling system of claim 15 further comprising machine learning gesture detect algorithm to correlate the gesture identified with a command for an operating software application.

19. The information handling system of claim 18, wherein the machine learning gesture detect algorithm sends the command to the operating software application to execute the command corresponding to the identified gesture in the software application.

20. The information handling system of claim 15 wherein the tagged telemetry data of the MMIC radar includes detecting the presence of a human within a short range, a mid-range, and a long-range category.

* * * * *